(12) United States Patent
Parker

(10) Patent No.: US 7,606,263 B1
(45) Date of Patent: Oct. 20, 2009

(54) PACKET PARSER

(75) Inventor: David K. Parker, Cheltenham (GB)

(73) Assignee: Extreme Networks, Inc., Santa Clara, CA (US)

( * ) Notice: Subject to any disclaimer, the term of this patent is extended or adjusted under 35 U.S.C. 154(b) by 896 days.

(21) Appl. No.: 10/835,272

(22) Filed: Apr. 28, 2004

Related U.S. Application Data

(60) Provisional application No. 60/558,039, filed on Mar. 30, 2004.

(51) Int. Cl.
*H04J 3/24* (2006.01)
(52) U.S. Cl. .................. 370/474; 370/392; 370/476; 370/469
(58) Field of Classification Search ............. 370/474, 370/254, 466, 389, 238, 392, 250, 469
See application file for complete search history.

(56) References Cited

U.S. PATENT DOCUMENTS

| | | | |
|---|---|---|---|
| 5,282,270 | A | 1/1994 | Oppenheimer et al. |
| 6,034,957 | A | 3/2000 | Haddock et al. |
| 6,172,980 | B1 | 1/2001 | Flanders et al. |
| 6,173,333 | B1 | 1/2001 | Jolitz et al. |
| 6,226,291 | B1 * | 5/2001 | Chauvel et al. ............. 370/392 |
| 6,275,861 | B1 | 8/2001 | Chaudri et al. |
| 6,295,299 | B1 | 9/2001 | Haddock et al. |
| 6,381,242 | B1 | 4/2002 | Maher, III et al. |
| 6,553,002 | B1 | 4/2003 | Bremer et al. |
| 6,570,877 | B1 | 5/2003 | Kloth et al. |
| 6,738,892 | B1 | 5/2004 | Coon et al. |
| 6,765,881 | B1 | 7/2004 | Rajakarunanayake |
| 6,781,601 | B2 * | 8/2004 | Cheung ..................... 345/629 |
| 6,871,262 | B1 | 3/2005 | Oren et al. |
| 6,882,642 | B1 | 4/2005 | Kejriwal et al. |
| 6,888,797 | B1 | 5/2005 | Cao et al. |
| 6,914,905 | B1 | 7/2005 | Yip |

(Continued)

FOREIGN PATENT DOCUMENTS

WO     WO 03/081857     10/2003

(Continued)

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Simon Sing
*Assistant Examiner*—Simon King
(74) *Attorney, Agent, or Firm*—Howrey LLP

(57) ABSTRACT

A packet parser is described that parses a packet by identifying the locations of respective packet layers. A staged approach to parsing the packet is employed whereby a first stage tests the packet data units within a first window for the presence of a first packet layer, and a second stage, at least partly in parallel with the first stage, tests the packet data units within a second overlapping window for the presence of a second packet layer. In response to an embedded packet comprising a first packet forming the payload portion of a second packet, the parser produces a data structure comprising first data that identifies the location of the first packet, second data that identifies the location of the second packet, third data that identifies one or more layers of the first packet, and fourth data that identifies one or more layers of the second packet.

33 Claims, 26 Drawing Sheets

U.S. PATENT DOCUMENTS

| | | | |
|---|---|---|---|
| 6,917,617 | B2 | 7/2005 | Jin et al. |
| 6,957,258 | B2 | 10/2005 | Maher, III et al. |
| 6,980,552 | B1 | 12/2005 | Belz et al. |
| 7,079,407 | B1 | 7/2006 | Dimitrelis |
| 7,152,191 | B2 | 12/2006 | Kessler et al. |
| 7,159,030 | B1 * | 1/2007 | Elzur .................. 709/238 |
| 7,187,694 | B1 * | 3/2007 | Liao .................. 370/474 |
| 7,190,696 | B1 | 3/2007 | Manur et al. |
| 7,236,492 | B2 * | 6/2007 | Davis et al. ............ 370/392 |
| 7,248,584 | B2 | 7/2007 | Hooper |
| 7,248,585 | B2 | 7/2007 | Kohn et al. |
| 7,274,693 | B1 | 9/2007 | Kloth et al. |
| 7,293,113 | B1 * | 11/2007 | Krishna et al. .......... 709/250 |
| 7,295,576 | B2 * | 11/2007 | Chauvel .................. 370/474 |
| 2001/0025315 | A1 | 9/2001 | Jolitz |
| 2002/0163935 | A1 * | 11/2002 | Paatela et al. ............ 370/466 |
| 2002/0191605 | A1 | 12/2002 | Lunteren et al. |
| 2003/0069973 | A1 | 4/2003 | Ganesan et al. |
| 2003/0193949 | A1 | 10/2003 | Kojima et al. |
| 2004/0003110 | A1 | 1/2004 | Ozguner |
| 2004/0100956 | A1 | 5/2004 | Watanabe |
| 2004/0205753 | A1 | 10/2004 | Moore |
| 2004/0246981 | A1 | 12/2004 | He et al. |
| 2005/0074009 | A1 | 4/2005 | Kanetake |
| 2005/0198362 | A1 | 9/2005 | Navada et al. |
| 2005/0226242 | A1 | 10/2005 | Parker |

OTHER PUBLICATIONS

Network Working Group, *RFC 1071—Computing the Internet Checksum*, Sep. 1988, available at: http://vvww.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via Incremental Update*, May 1994, available at: http://www.faqs.org/rfcs/rfc1624.html.

Netlogic Microsystems, Product Brief NSE5000GLQ, Copyright 2004, available at: http://www.netlogicmicro.com/datasheets/nse5000glq.html.

Zhang, Z., *Recovery of Memory and Process in DSM Systems: HA Issue#1*, Hewlett-Packard Co. HPL-2001-76, Mar. 30, 2001.

* cited by examiner

| BIT | FUNCTION | DESCRIPTION |
|---|---|---|
| 15-0 | PTI | PORT TAG INDEX. |
| 19-16 | EQoS | EGRESS QUEUE SELECT. |
| 23-20 | LAI | LAI INDEX. |
| 24 | JUMBO | EGRESS JUMBO CHECK FLAG. |
| 25 | DON'T FRAG | DON'T FRAGMENT FLAG. |
| 26 | IF TYPE | INGRESS INTERFACE TYPE. 0 = ETHERNET, 1 = POS INTERFACE. |
| 27 | - | RESERVED. |
| 28 | ROUTE | ROUTE FLAG. |
| 29 | RED | RANDOM EARLY DROP. |
| 31-30 | CTL | AFH FORMAT TYPE. |
| 51-32 | TXMI | TRANSMIT MODIFICATION INDEX. |
| 58-52 | CQoS | CPU QUEUE SELECT. |
| 59 | CPU COPY | CPU COPY FLAG. |
| 60 | REDIRECT | REDIRECT FLAG. |
| 61 | SSAMPLE | STATISTICAL SAMPLE FLAG. |
| 62 | LEARN | LEARN FLAG. REQUESTS OT TO SEND A COPY OF THE PACKET TO THE CPU FOR LEARN PROCESSING. |
| 63 | EMIRROR | EGRESS MIRROR. |
| 75-64 | IQoS | INGRESS QUEUE SELECT. |
| 78-76 | EMRK SEL | EGRESS MARK SELECT. |
| 81-79 | EMRK MASK | EGRESS MARK MASK. |
| 82 | IMIRROR | INGRESS MIRROR. |
| 83 | PERR KILL | PARITY ERROR KILL. |

FIGURE 2

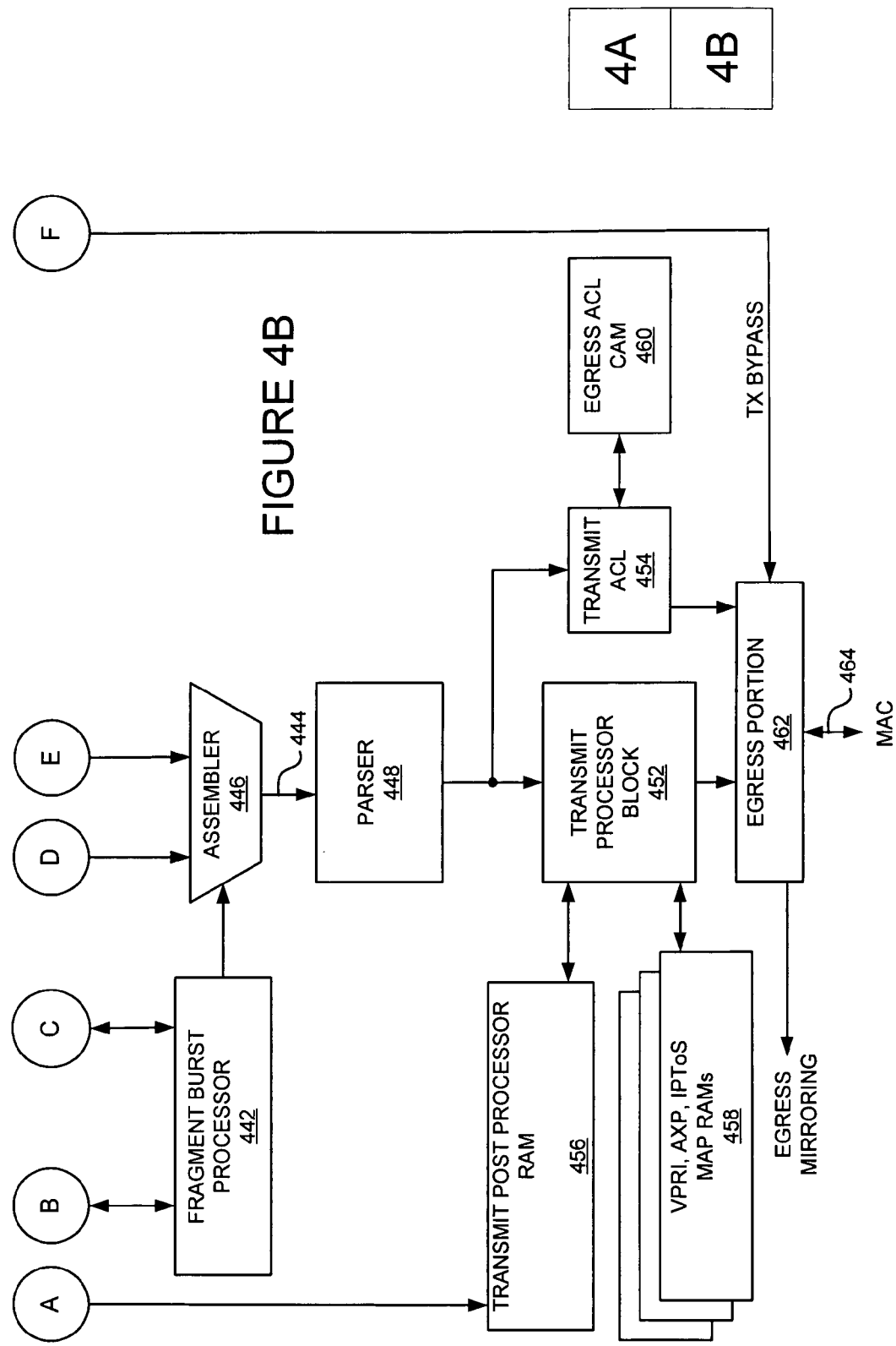

Context 0 : 0
Context 1 : MAC Header Start
Context 2 : Encapsulation/EtherType Start
Context 3 : MPLS Start
Context 4 : L3 Outer Start
Context 5 : L3 Inner Start
Context 6 : L4 Start

FIGURE 24

| Field | Size | Description |
| --- | --- | --- |
| MAC Context Pointer | 8 | Starting byte location of MAC Header. |
| EtherType Context Pointer | 8 | Starting byte location of EtherType/LLC/PPID field. |
| MPLS Context Pointer | 8 | Starting byte location of MPLS Label Stack. |
| L3 Outer Context Pointer | 8 | Starting byte location of Outer L3 Header. |
| L3 Inner Context Pointer | 8 | Starting byte location of Inner L3 Header. |
| L4 Context Pointer | 8 | Starting byte location of L4 Structure. |
| Packet Flags | 16 | |
| VLAN Count | 2 | Absolute count of the number of VLANs detected in the packet. Legal values are 0x0,0x1,0x2. 0x3 is reserved. |
| VLAN Match Matrix | 4 | Matrix reflecting VLAN Probe vs packet VLAN Header comparison. Bit 3:0 correspond to Probe1VLAN1; Probe1VLAN0; Probe0;VLAN1; Probe0;VLAN0 |
| VLAN Tag 0,1 | 16 +16 | VLAN Tags for VLAN Header 0 and 1 (if present). |
| EtherType | 16 | Extracted EtherType / PPID / LLC field. |
| MPLS Label Count | 4 | Absolute MPLS Label Count. All values valid. |
| Outer IP Type | 2 | Encodes Outer IP Header type. 0x0 – neither. 0x1 – IP v4. 0x2 – IP v6. 0x3 – reserved. |
| Outer IP Fragment Type | 2 | Encodes Outer IP Fragment type. 0x0 – only or single. 0x1 – first. 0x2 – last. 0x3 – middle. |
| Outer IP Don't Fragment | 1 | For Outer IP Header = v4, reflects setting of Don't Fragment flag. For Outer IP Header = v6, always set. |
| Outer IP Protocol | 8 | Protocol field resulting from processing of Outer IP Header and any following Next Header structures. |
| Outer IP Next Header Exception | 6 | Exception flags for Outer IP Header, covering PIM, GRE and Next Header processing. |
| Inner IP Type | 2 | Encodes Inner IP Header type. 0x0 – neither. 0x1 – IP v4. 0x2 – IP v6. 0x3 – reserved. |
| Inner IP Fragment Type | 2 | Encodes Inner IP Fragment type. 0x0 – only or single. 0x1 – first. 0x2 – last. 0x3 – middle. |
| Inner IP Don't Fragment | 1 | For Inner IP Header = v4, reflects setting of Don't Fragment flag. For Inner IP Header = v6, always set. |
| Inner IP Protocol | 8 | Protocol field resulting from processing of Inner IP Header and any following Next Header structures. |
| Inner IP Next Header Exception | 6 | Exception flags for Inner IP Header, covering PIM, GRE and Next Header processing. |
| L4 OCS | 16 | One's Complement Sum (OCS) of L3/L4 structure. |

FIGURE 25

| Field | Rx Ingress Parsing | Tx Ingress Parsing | Tx Egress Parsing |
|---|---|---|---|
| Mac Context Pointer | Y | Y | Y |
| EtherType Context Pointer | Y | Y | |
| MPLS Context Pointer | Y | Y | Y |
| L3 Outer Context Pointer | Y | Y | Y |
| L3 Inner Context Pointer | Y | Y | Y |
| L4 Context Pointer | Y | Y | Y |
| Packet Flags | Y | Y | |
| VLAN Count | | | Y |
| VLAN Match Matrix | Y | | |
| VLAN Tag 0,1 | Y | | |
| EtherType | Y | | |
| MPLS Label Count | | | Y |
| Outer IP Type | | | Y |
| Outer IP Fragment Type | Y | | |
| Outer IP Don't Fragment | Y | | |
| Outer IP Protocol | Y | | Y |
| Outer IP Next Header Exception | Y | | |
| Inner IP Type | | | Y |
| Inner IP Fragment Type | Y | | |
| Inner IP Don't Fragment | Y | | |
| Inner IP Protocol | Y | | Y |
| Inner IP Next Header Exception | Y | | |
| L4 OCS | | Y | |

FIGURE 26

PACKET PARSER

This application claims the benefit of U.S. Provisional Application Ser. No. 60/558,039, filed Mar. 30, 2004, which is hereby fully incorporated herein by reference as though set forth in full.

FIELD OF THE INVENTION

This invention relates to the field of packet processing, and more specifically, to the parsing of packets into their constituent layers.

RELATED ART

Current packet parsers are under increasing pressure to handle higher and higher data throughputs of, e.g., 10 GB/s or more, and more complex and diverse data packet formats, e.g., embedded packet formats. However, these parsers are subject to various bottlenecks and constraints that limit the data throughput that is achievable and the packet formats that can be handled. Hence, there is a need for a packet parser that overcomes the problems of the prior art.

SUMMARY OF THE INVENTION

A first aspect of the invention comprises a method of parsing a packet. The packet has a plurality of packet data units and a plurality of packet layers, each having locations within the packet. In this method, one or more of the packet data units within a first window are tested for the presence of a first packet layer. If the first packet layer is detected within the first window, the location of the first layer within the packet is identified.

One or more of the packet data units within a second window are also tested for the presence of a second packet layer. This testing occurs at least partly in parallel with the testing for the presence of the first packet layer. This second window at least partially overlaps the first window. If the second packet layer is detected within the second window, the location of the second layer within the packet is identified.

A second aspect of the invention comprises a data structure representing an embedded packet. This embedded packet comprises a first packet forming the payload portion of a second packet. These first and second packets have locations within the embedded packet. Moreover, each of the first and second packets has one or more packet layers, each having a location within the respective packet. The data structure is stored on a processor readable medium. This data structure has first data identifying the location of the first packet within the embedded packet, and second data identifying the location of the second packet within the embedded packet. It also has third data identifying the location of one or more layers within the first packet, and fourth data identifying the location of one or more layers within the second packet.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2 illustrates an example of the format of a packet header as produced by an embodiment of a packet classification system in a packet processing system.

FIGS. 4A-4B are a block diagram of an embodiment of a transmit-side packet modification system.

FIG. 24 illustrates the context pointers produced in one embodiment of a parsing method or system according to the invention.

FIG. 25 illustrates a detailed example of the data structure produced for a page in one embodiment of a parsing method or system according to the invention.

FIG. 26 illustrates the differing usage of the data structure of FIG. 25 by the three instantiations of the parser illustrated in FIG. 1.

RELATED APPLICATIONS

Figure 1:
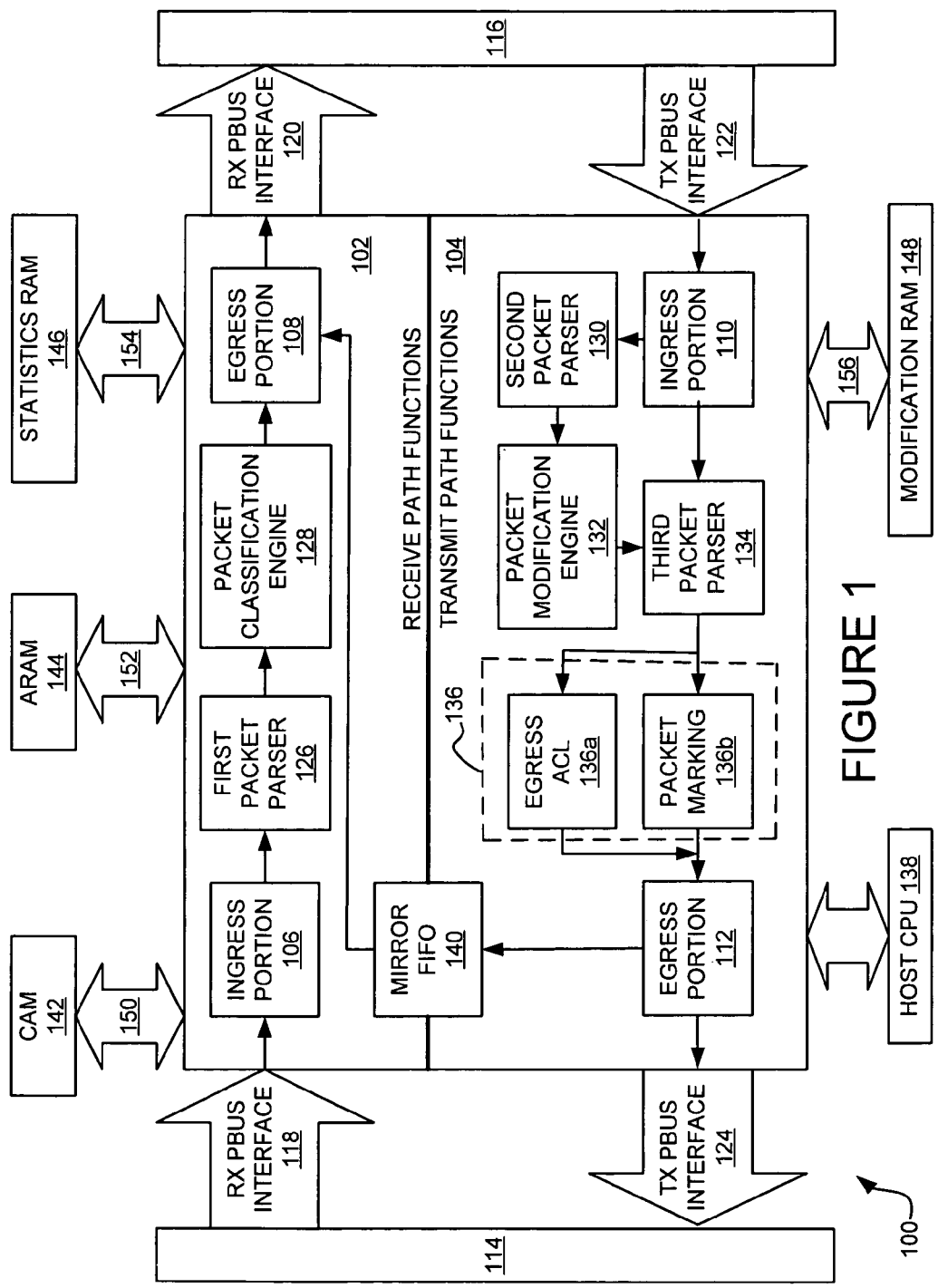
FIG. 1 is a block diagram of an embodiment of a packet processing system that comprises a receive-side packet classification system and a transmit-side packet modification system.

The following applications are commonly owned by the assignee hereof, and are each incorporated by reference herein as though set forth in full:

| Howrey Dkt. No. | Extreme Dkt. No. | Title | Filing date |
|---|---|---|---|
| 02453.0025.NPUS00 | P111 | PACKET PROCESSING SYSTEM ARCHITECTURE AND METHOD | Mar. 30, 2004 |
| 02453.0025.NPUS01 | P153 | PACKET PROCESSING SYSTEM ARCHITECTURE AND METHOD | Mar. 30, 2004 |
| 02453.0026.NPUS00 | P122 | PACKET DATA MODIFICATION PROCESSOR | Mar. 30, 2004 |
| 02453.0027.NPUS00 | P124 | SYSTEM AND METHOD FOR PACKET PROCESSOR STATUS MONITORING | Mar. 30, 2004 |
| 02453.0028.NPUS00 | P126 | METHOD AND SYSTEM FOR INCREMENTALLY UPDATING A CHECKSUM IN A NETWORK DATA PACKET | Mar. 30, 2004 |
| 02453.0029.NPUS00 | P127 | SYSTEM AND METHOD FOR EGRESS PACKET MARKING | Mar. 30, 2004 |
| 02453.0030.NPUS00 | P128 | SYSTEM AND METHOD FOR ASSEMBLING A DATA PACKET | Mar. 30, 2004 |
| 02453.0032.NPUS00 | P125 | PACKET DATA MODIFICATION PROCESSOR COMMAND INSTRUCTION SET | Mar. 30, 2004 |
| 02453.0033.NPUS00 | P123 | DATA STRUCTURES FOR SUPPORTING PACKET DATA MODIFICATION OPERATIONS | Mar. 30, 2004 |
| 02453.0035.NPUS00 | P144 | SYSTEM FOR DERIVING PACKET QUALITY OF SERVICE INDICATOR | Concurrently herewith |
| 02453.0037.NPUS00 | P146 | PIPELINE PACKET PROCESSOR | Concurrently herewith |
| 02453.0038.NPUS00 | P147 | SYSTEM FOR DERIVING HASH VALUES FOR PACKETS IN A PACKET PROCESSING SYSTEM | Concurrently herewith |
| 02453.0039.NPUS00 | P148 | SYSTEMS FOR SUPPORTING PACKET PROCESSING OPERATIONS | Concurrently herewith |
| 02453.0040.NPUS00 | P149 | SYSTEM FOR ACCESSING CONTENT-ADDRESSABLE MEMORY IN A PACKET PROCESSOR | Concurrently herewith |
| 02453.0041.NPUS00 | P150 | SYSTEM FOR STATISTICS GATHERING AND SAMPLING IN A PACKET PROCESSING SYSTEM | Concurrently herewith |
| 02453.0042.NPUS00 | P151 | EXCEPTION HANDLING SYSTEM FOR PACKET PROCESSOR | Concurrently herewith |

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the terms "software" or "instructions" or "commands" include source code, assembly language code, binary code, firmware, macro-instructions, micro-instructions, or the like, or any combination of two or more of the foregoing.

The term "memory" refers to any processor-readable physical or logical medium, including but not limited to RAM, ROM, EPROM, PROM, EEPROM, disk, floppy disk, hard disk, CD-ROM, DVD, queue, FIFO or the like, or any combination of two or more of the foregoing, on which may be stored one or more instructions or commands executable by a processor, data, or packets in whole or in part.

The terms "processor" or "CPU" or "engine" refer to any device capable of executing one or more commands or instructions and includes, without limitation, a general- or special-purpose microprocessor, finite state machine, controller, computer, digital signal processor (DSP), or the like.

The term "logic" refers to implementations in hardware, software, or combinations of hardware and software.

The term "stack" may be implemented through a first-in-first-out memory such as a FIFO.

The term "packet" means (1) a group of binary digits including data and control elements which is switched and transmitted as a composite whole, wherein the data and control elements and possibly error control information are arranged in a specified format; (2) a block of information that is transmitted within a single transfer operation; (3) a collection of symbols that contains addressing information and possibly error detection or correction information; (4) a sequence of characters with a specific order and format, such as destination followed by a payload; (5) a grouping of data of some finite size that is transmitted as a unit; (6) a frame; (7) the logical organization of control and data fields defined for any of the layers or sub-layers of an applicable reference model, including the OSI or TCP/IP reference models, e.g., MAC sub-layer; or (8) a unit of transmission for any of the layers or sub-layers of an applicable reference model, including the OSI or TCP/IP reference models.

The term "layer two of the OSI reference model" includes the MAC sub-layer.

The term "port" or "channel" refers to any point of ingress or egress to or from a switch or other entity, including any port channel or sub-channel, or any channel or sub-channel of a bus coupled to the port.

The term "packet processing state data" in relation to a packet refers to data representative of at least a portion of the packet, data representative of at least a portion of the state of processing of the packet, or both.

Example Environment

An example environment for the subject invention will now be described. Many others examples are possible, so nothing in this example should be taken as limiting.

FIG. 1 illustrates an embodiment 100 of a packet processing system comprising a packet classification system 102 and a packet modification system 104. The packet classification system 102 has an ingress portion 106 and an egress portion 108. Similarly, the packet modification system 104 has an ingress portion 110 and an egress portion 112. The ingress portion 106 of the packet classification system 102 is coupled, through interface 118, to one or more network-side devices 114, and the egress portion 108 of the packet classification system 102 is coupled, through interface 120, to one or more switch-side devices 116. The ingress portion 110 of the packet modification system 104 is coupled, through interface 122, to the one or more switch-side devices 116, and the egress portion 124 of the packet modification system 104 is coupled, through interface 112, to the one or more network-side devices 114.

The packet classification system 102 comprises an ingress portion 106, a first packet parser 126 for parsing a packet and providing first data representative thereof, and a packet classification engine 128 for classifying the packet responsive to the first data. The packet modification system 104 comprises a second packet parser 130 for parsing the classified packet (after a round trip through the one or more switch-side devices 116) or a packet derived there-from and providing second data representative thereof, a packet modification engine 132 for modifying some or all of the packet responsive to the second data, a third packet parser 134 for parsing the modified packet and providing third data representative thereof, and a packet post-processor 136 for post-processing the modified packet responsive to the third data.

In one embodiment, the packet undergoing processing by the system has a plurality of encapsulated layers, and each of the first, second and third parsers 126, 130, 134 is configured to parse the packet by providing context pointers pointing to the start of one or more of the encapsulated layers. In a second embodiment, the packet undergoing processing by the system comprises a first packet forming the payload portion of a second packet, each of the first and second packets having a plurality of encapsulated layers, and each of the first, second and third parsers 126, 130, 134 is configured to parse the packet by providing context pointers pointing to the start of one or more of the encapsulated layers of the first packet and one or more of the encapsulated layers of the second packet.

In one implementation, the packet post-processor 136 is configured to compute a checksum for a modified packet responsive to the third data provided by parser 134. In one embodiment, the packet post-processor 136 is configured to independently calculate a layer three (IP) and layer four (TCP/UDP) checksum.

In one embodiment, packet post-processor 136 comprises Egress Access Control List (ACL) logic 136a and Packet Marking logic 136b. The Egress ACL logic 136a is configured to arrive at an ACL decision with respect to a packet. In one implementation, four ACL decisions can be independently performed: 1) default ACL action; 2) CPU copy; 3) mirror copy; and 4) kill. The default ACL action may be set to kill or allow. The CPU copy action forwards a copy of the packet to a host 138 coupled to the system. The mirror copy action implements an egress mirroring function (to be discussed in more detail later), in which a copy of the packet is forwarded to mirror FIFO 140 and then on to the egress portion 108 of the packet classification system 102. The kill action either kills the packet or marks it for killing by a downstream Medium Access Control (MAC) processor.

The Packet Marking logic 136b is configured to implement a packet egress marking function in which certain packet marking control information for a packet generated by the packet classification system 102 is used to selectively modify one or more quality of service (QoS) fields in the packet.

In one embodiment, Content Addressable Memory (CAM) 142 is used by the packet classification system 102 to perform packet searches to arrive at a classification decision for a packet. In one implementation, the CAM searches are ternary in that all entries of the CAM have a data and mask field allowing don't care setting of any bit position in the data field. In another implementation, the CAM searches are binary, or combinations of binary and ternary.

The associated RAM (ARAM) 144 provides associated data for each entry in the CAM 142. The ARAM 144 is accessed using the match address returned by the CAM 142 as a result of a search operation. The ARAM 144 entry data is used to supply intermediate classification information for the packet that is used by the classification engine 128 in making a final classification decision for the packet.

The statistics RAM 146 is used to maintain various packet statistics, including, for each CAM entry, the cumulative number and size of packets which hit or matched that entry.

The modification RAM 148 provides data and control structures for packet modification operations performed by the modification engine 132.

In one implementation, the interfaces 150, 152, 154, and 156 with any of the RAMs or CAMs may be a QDR- or DDR-type interface as described in U.S. patent application Ser. No. 10/655,742, filed Sep. 4, 2003, which is hereby fully incorporated by reference herein as though set forth in full.

FIG. 2 illustrates the format of classification data 200 for a packet as produced by one embodiment of packet classification system 102. The classification data 200 in this embodiment has first and second portions, identified respectively with numerals 202 and 204. The first portion 202 is a 64 bit Address Filtering Header (AFH) which is pre-pended to the packet. The second portion 204 is a 20 bit grouping of flags which are encoded as control bits maintained by the system 100.

In one embodiment, the Port Tag Index (PTI) field is an identifier of the port or list of ports within interface 118 over which the packet will be sent by the packet modification engine. (The assumption in this embodiment is that the interface 118 is a multi-port interface).

The Egress Quality of Service (EQOS) field may be used to perform an egress queue selection function in a device encountering the packet. In one embodiment, this field also encodes one of the following functions: nothing, preemptive kill, normal kill, thermonuclear kill, egress mirror copy, preemptive intercept to host, and normal intercept to host.

The Link Aggregation Index (LAI) field may be used to implement physical link selection, ingress alias, echo kill alias, or equal cost multi-path functions in a device encountering the packet.

The JUMBO flag, if asserted, directs a device encountering the packet to perform a JUMBO-allowed check. In one embodiment, the flag is used to implement the policy that the only valid JUMBO packets are IP packets. Therefore, if the packet is a non-IP JUMBO packet, the device either sends it to a host, fragments it, or kills it.

The DON'T FRAG flag, if asserted, directs a device encountering the packet not to fragment it in the course of implementing a JUMBO-allowed check.

The IF TYPE flag indicates whether the ingress interface over which the packet was received is an Ethernet or Packet Over Sonet (POS) interface.

The ROUTE flag, if asserted, indicates that the packet is being bridged not routed, and may be used by devices encountering the packet to implement an echo kill suppress function.

The RANDOM EARLY DROP (RED) flag may be used to implement a random early drop function in devices encountering the packet.

The CTL flag indicates the format of the AFH. FIG. 2 illustrates the format of the header for packets exiting the packet classification system 102 and destined for the one or more switch-side devices 116. Another format applies for packets exiting the one or more switch-side devices 116 and destined for the packet modification system 104. The CTL flag indicates which of these two formats is applicable.

The Transmit Modification Index (TXMI) field is used by the modification engine 132 to retrieve control and data structures from Modification RAM 148 for use in performing any necessary modifications to the packet.

The CPU Quality of Service (CQoS) field may be used to perform an ingress queue select function in a host coupled to the packet processing system.

In one embodiment, the CPU Copy flag, if asserted, directs one or more of the switch-side devices 116 to forward a copy of the packet to a host coupled to the packet processing system. In another embodiment, the CPU Copy flag, if asserted, directs a copy of a packet to be forwarded to the host through a host bus or another PBUS.

The Redirect flag, if asserted, directs one or more of the switch-side devices 116 to forward a copy of the packet to the host for redirect processing. In redirect processing, the host receives the packet copy and redirects it to the sender, with an indication that the sender should switch the packet, not route it.

The Statistical Sample (SSAMPLE) flag, if asserted, indicates to one or more of the switch-side devices 116 that the packet is a candidate for statistical sampling. If the packet is ultimately selected for statistical sampling, a copy of the packet is directed to the host, which performs a statistical analysis of the packet for the purpose of accurately characterizing the network traffic of which the packet is a part.

The LEARN flag, if asserted, directs one or more of the switch-side devices 116 to forward a copy of the packet to the host so the host can perform learn processing. In learn processing, the host analyzes the packet to "learn" the sender's MAC address for future packet switching of packets to that address.

The Egress Mirror (EMIRROR) flag, if asserted, implements egress mirroring by directing one or more of the switch-side devices 116 to send a copy of the packet to mirror FIFO 140. From mirror FIFO 140, the packet passes through the egress portion 108 of the packet classification system 102 en route to the one or more switch-side devices 116.

The Ingress Quality of Service (IQoS) field may be used to perform an ingress queue selection function in a device encountering the packet.

The Egress Mark Select (EMRK SEL) field selects one of several possible egress mark functions. The Egress Mask (EMRK MASK) field selects one of several possible egress masks. Together, the EMRK SEL and EMRK MASK fields forms an embodiment of packet egress marking control information which may be used by packet marking logic 136b to mark the packet, i.e., selectively modify one or more QoS fields within the packet.

The Ingress Mirror (IMIRROR) flag, if asserted, directs one or more of the switch-side devices 116 to forward a copy of the packet to the designated ingress mirror port on the switch.

The Parity Error Kill (PERR KILL) flag, if asserted, directs the interface 120 to kill the packet due to detection of an ARAM parity error.

In one embodiment, the EMIRROR bit is normally in an unasserted state. If the packet classification system 102, after analyzing the packet, determines that egress mirroring of the packet is appropriate, the packet classification system 102 changes the state of the EMIRROR bit to place it in the asserted state.

The packet, along with a pre-pended AFH containing the EMIRROR bit, is then forwarded to the one or more switch-side devices 116. After processing the packet, the one or more devices transmit the packet, with the EMIRROR bit preserved in a pre-pended packet header, back to the packet modification system 104 over interface 122. In response, the packet modification system 104 is configured to detect the state of the EMIRROR bit to determine if egress mirroring of the modified packet is activated, and if so, provide a copy of the modified packet to the egress portion 108 of the packet classification system 102 through the mirror FIFO 140.

In one embodiment, the EQoS, CQoS, IQoS, EMRK SEL and EMRK MASK fields define a multi-dimensional quality of service indicator for the packet. In this embodiment, the EMRK SEL and EMRK MASK fields form packet egress marking control information which is utilized by packet modification system 104 to selectively modify one or more quality of service fields within the packet, or a packet derived there-from.

The quality of service indicator for a packet may be derived from a plurality of candidate quality of service indicators derived from diverse sources. In one embodiment, a plurality of candidate quality of service indicators are derived for a packet, each with an assigned priority, and a configurable priority resolution scheme is utilized to select one of the plurality of quality of service indicators for assigning to the packet. In one embodiment, one or more of the candidate quality of service indicators, and associated priorities, are derived by mapping one or more fields of the packet into one or more candidate quality of service indicators for the packet and associated priorities. In a second embodiment, one or more searches are conducted to obtain one or more candidate quality of service indicators for the packet and associated priorities. In a third embodiment, a combination of these two approaches is utilized.

In one example, candidate quality of service indicators, and associated priorities, are derived from three sources. The first is a VLAN mapping, scheme in which a VLAN from the packet is mapped into a candidate quality of service indicator and associated priority using a VLAN state table (VST). The VLAN from the packet may represent a subnet or traffic type, and the associated priority may vary based on the subnet or traffic type. The second is a CAM-based search that yields an associated ARAM entry which in turn yields a candidate quality of service indicator. A field of an entry in a Sequence Control Table (SCT) RAM, which provides the sequence of commands controlling the operation of one embodiment of the packet classification engine 102, provides the associated priority. The third is a QoS mapping scheme, which operates in one of three modes, as determined by a field in a SCT RAM entry.

In the first mode, the .1p mapping mode, the VST provides the four QSEGment bits. The QSEG and the .1p bits are mapped into a candidate quality of service indicator, and the VLAN itself is mapped into an associated priority using the VST. In the second mode, the MPLS mapping mode, the EXP/QOS fields from the packet are mapped into a candidate quality of service indicator, and a VLAN from the packet is mapped into the associated priority using the VST. In the third mode, the ToS mapping mode, the IPv4ToS, IPv6 Traffic Class, or Ipv6 Flow Label based QoS fields are mapped into a candidate quality of service indicator, and a VLAN from the packet is mapped into an associated priority using the VST.

In this example, the candidate quality of service indicator with the highest priority is assigned to the packet. Moreover, a candidate from one of the sources can be established as the default, which may be overridden by a candidate obtained from one of the other sources, at least a candidate that has a higher priority than the default selection. For example, the candidate quality of service indicator resulting from the .1p mapping mode can be established as the default selection, and this default overridden only by a candidate quality of service indicator resulting from an ARAM entry in turn resulting from a CAM-based search.

Figure 3:
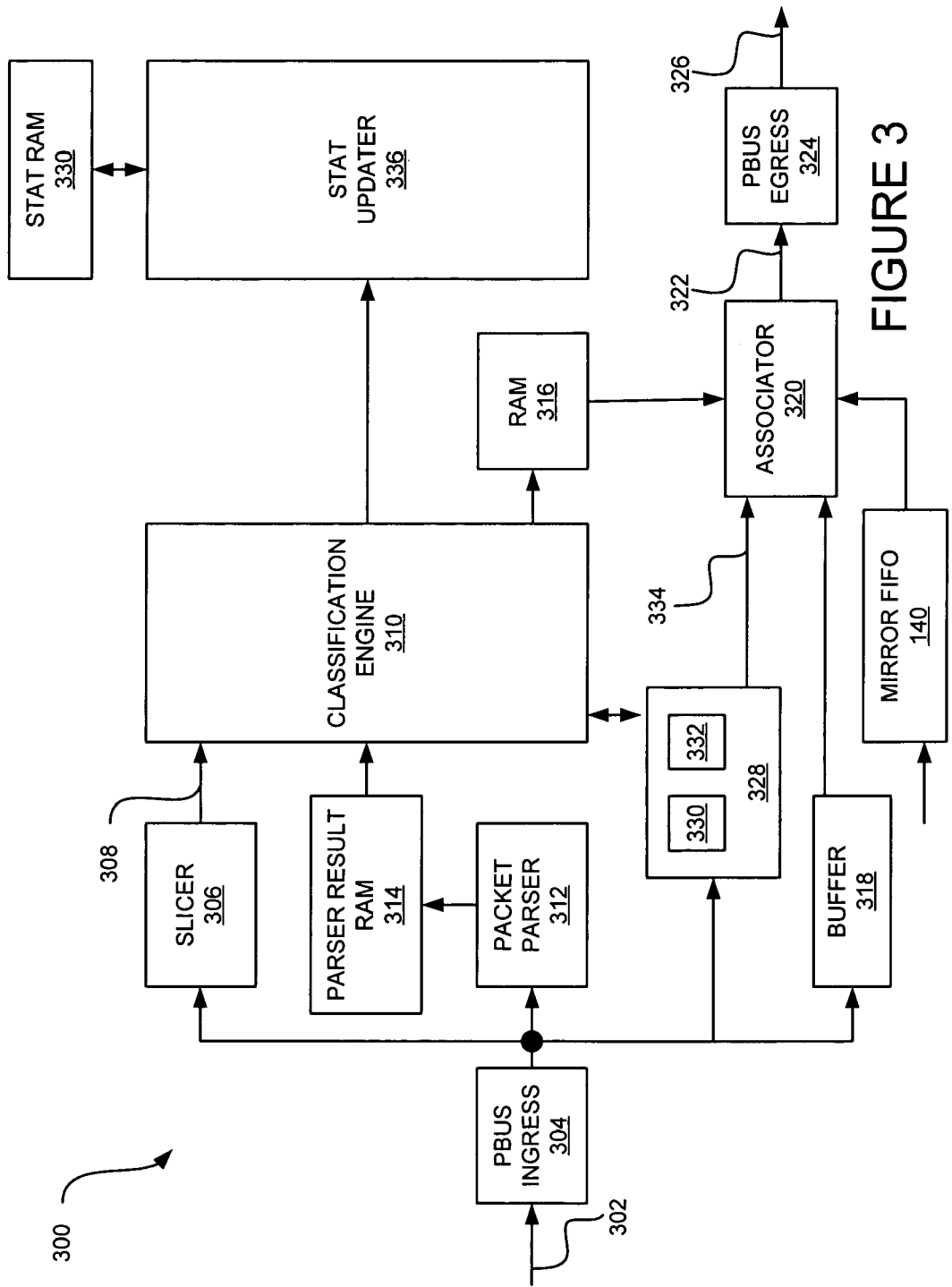
FIG. 3 is a block diagram of an embodiment of a receive-side packet classification system.

FIG. 3 illustrates an embodiment 300 of a packet classification system. In this embodiment, the packet classification system is coupled to one or more network-side devices through a multi-port packet bus (PBUS) 302, as described in U.S. patent application Ser. Nos. 10/405,960 and 10/405,961, filed Apr. 1, 2003, which are both hereby fully incorporated herein by reference. PBUS ingress logic 304 is configured to detect a start of packet (SOP) condition for packets arriving at the packet classification system over the PBUS.

Upon or after detection of the SOP condition, the packet, or a portion thereof, is stored in slicer 306. Slicer 306 is configured to slice some or all of a packet into portions and provide the portions in parallel over first data path 308 having a first width to classification engine 310. In one embodiment, the slicer 306 is a FIFO which stores the first 128 bytes of a packet (or the entirety of the packet if less than 128 bytes), and provides the 1024 bits thereof in parallel to the packet classification engine 310 over the first data path 308.

Upon or after detection of the SOP condition, parser 312 parses the packet in the manner described previously, and stores the resultant context pointers (and other flags resulting from the parsing process) in parser result RAM 314. Concurrently with this parsing process, the packet is stored in buffer 318, which in one embodiment, is a FIFO buffer.

The packet classification engine 310 is configured to classify the packet responsive to the packet portions received over the first data path 308 and the parser results as stored in the parser result RAM 314, and store data representative of the packet classification in classification RAM 316. In one embodiment, the classification data is the AF header illustrated in FIG. 2.

An associator 320 is configured to associate the data representative of the packet classification with some or all of the packet, and provide the associated packet over a second data path 322 having a second width less than the first width.

The packet classification system is coupled to one or more switch-side devices over a multi-port PBUS 326, and PBUS egress logic 324 is configured to transmit the associated packet over the PBUS 326.

In one embodiment, slicer 306 comprises a plurality of memories configured to store some or all of the packet, and provide the portions thereof in parallel over the first data path 308 to the classification engine 310. In one example, the slicer 306 is configured as eight (8) memories configured to provide the first 1024 bits of the bits of the packet (or less if the packet is less than 128 bytes) in parallel over the first data path 308 to classification engine 310.

In one embodiment, the associator 320 comprises a multiplexor configured to multiplex onto the second data path 322 the data representative of the packet classification as stored in classification RAM 316 and some or all of the packet as stored in buffer 318. In one implementation, the multiplexor multiplexes the first 8 byte portion 202 of the AF data illustrated in FIG. 2 (which may be referred to as the AF header) onto the second data path followed by the packet as stored in buffer 318, thereby effectively pre-pending the AF header to the packet. In this implementation, control logic 328 controls the operation of the multiplexor through one or more signals provided over control data path 334.

More specifically, the multiplexor in this implementation is configured to select one of three inputs and output the selected input to the second data path 322 under the control of the control logic 328. The first input is the classification data as stored in classification RAM 316. The second input is the packet as stored in buffer 318. The third input is the output of the mirror FIFO 140. This third input is selected when the egress mirroring function, discussed previously, is activated.

In one embodiment, the control logic 328 is also configured to maintain first and second FIFO buffers, identified respectively with numerals 330 and 332, the first FIFO buffer 330 for identifying those packets which are awaiting classification by the packet classification system, and the second FIFO buffer 332 for identifying those packets which are undergoing classification by the classification system.

In this embodiment, the control logic 328 is configured to place an identifier of a packet on the first FIFO buffer 330 upon or after receipt of the packet by the packet classification system, pop the identifier off the first FIFO buffer 330 and place it on the second FIFO buffer 332 upon or after initiation of classification processing of the packet by the packet classification system, and pop the identifier off the second FIFO buffer 332 upon or after completion of classification processing of the packet by the packet classification system.

The control logic 328 is configured to prevent the packet classification system from outputting a packet onto PBUS 326 while an identifier of the same is placed on either the first or second FIFO buffers 330, 332, and allows the packet classification system to output the packet onto PBUS 326 upon or after the identifier of the packet has been popped off the second FIFO buffer 332. In one implementation, the control logic 328 prevents the associator 320 from outputting data on the second data path 322 through one or more signals provided over control data path 334. In one implementation, the control logic 328 is a state machine.

In one embodiment, the control logic 328 forms the basis of a packet statistics maintaining system within the packet classification system. In this embodiment, the control logic 328 is configured to maintain a pool of packet size determiners, and allocate a packet size determiner to a packet from the pool upon or after receipt thereof by the packet classification system.

In one implementation, the control logic 328 allocates a packet size determiner to a packet upon or after the PBUS ingress logic 304 signals a SOP condition for the packet. The packet size determiner is configured to determine the size of the packet, and the control logic 328 is configured to return the packet size determiner to the pool upon or after the same has determined the size of the packet. In one implementation example, the packet size determiners are counters.

Statistics RAM 330 in this embodiment maintains packet statistics, and statistics update logic 336 is configured to update the packet statistics responsive to the determined size of the packet. In one implementation, the statistics update logic 336 includes a queue for queuing statistics update requests issued by the control logic 328.

In one configuration, the packet statistics maintaining system is configured to maintain packet statistics indicating the cumulative size of packets which have met specified processing conditions or hits, and the statistics update logic 336, upon or after a packet size determiner has determined the size of a packet, is configured to increment a cumulative size statistic for a particular processing condition or hit by the determined size of the packet if the packet satisfies that particular processing condition or hit. In one example, the system maintains statistics indicating the cumulative size and number of packets which have resulted in each of a plurality of ternary CAM 142 hits.

Figure 4A:
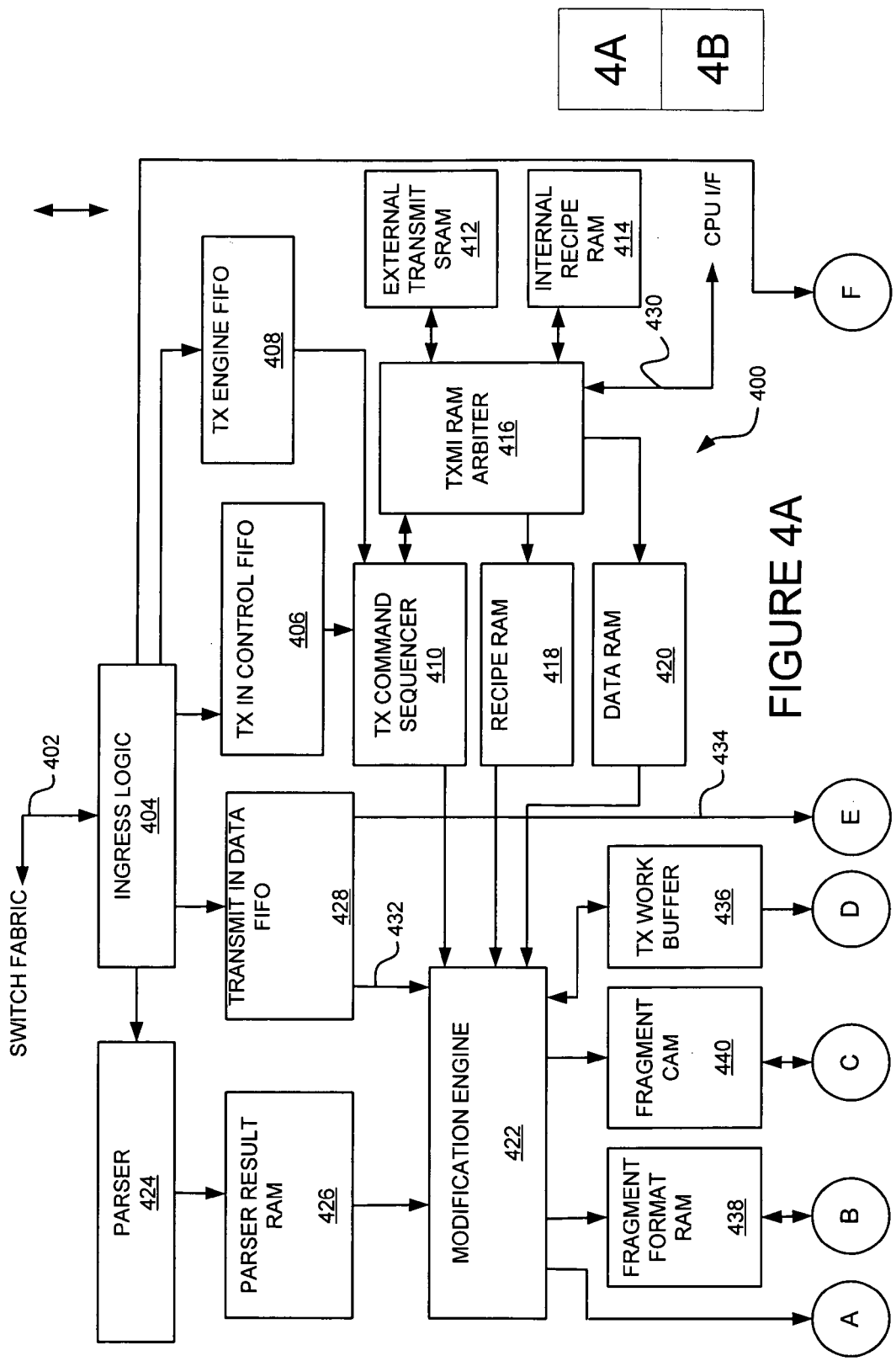

FIGS. 4A-4B illustrate an embodiment 400 of a packet modification system having PBUS ingress logic 404 which is coupled to one or more switch-side devices through PBUS 402. In this embodiment, the packets are received over the PBUS channels in bursts. The PBUS ingress logic 404 is configured to monitor the PBUS channels in a round robin fashion. When the PBUS ingress logic 404 detects a SOP condition on one of the channels, the Transmit Modification Index (TXMI) is extracted from the AF header of the packet, and it, along with the length of the initial packet burst, and an end of packet (EOP) marker if the packet length is less than or equal to the burst length, is placed on Transmit In Control FIFO 406. The packet or packet burst is stored in Transmit In Data FIFO 428, and a pointer to the start of the packet or packet burst (SOP pointer) is stored in Transmit Engine FIFO 408, along with an identifier of the PBUS channel over which the packet or packet burst was received. In one implementation, the packet bursts are 128 bytes in length.

Transmit In Data FIFO 428 stores the packet data such that portions of the packet can be passed in parallel over a first data path 402 having a first width to a modification engine 422. In one implementation, the Transmit In Data FIFO 428 comprises a plurality of FIFOs, with the outputs of the FIFOs coupled in parallel to the modification engine 422 and collectively forming the first data path 402. Incoming packet or packet bursts are copied into each of the plurality of FIFOs, thereby providing the modification engine with sliced portions of the packets or packet bursts in parallel.

The incoming packets or packet bursts are also input to the second packet parser 424, which parses the packets or packet bursts in the manner described previously. The context pointers and status bits resulting from the parsing process are stored in parser result RAM 426.

The Transmit Command Sequencer 410 is configured to read a SOP pointer and channel from the Transmit Engine FIFO 408, and utilize this information to locate the packet or packet bursts in the Transmit In Control FIFO 406. The Transmit Modification Index (TXMI) within the AF header of this packet or packet burst is then located and used to access a TXMI link in External Transmit SRAM 412, an SRAM located off-chip in relation to modification engine 422. The TXMI link may either be 1) an internal recipe link to a recipe of modification commands stored in Internal Recipe RAM 414, an on-chip RAM in relation to modification engine 422, and related data structures stored in External Transmit SRAM 412, or 2) an external recipe link to a recipe of modification commands stored in External Transmit SRAM 412 and related data structures also stored in External Transmit SRAM 412.

The sequencer 410 also assigns a sequence number to the packet to prevent packet re-ordering. It then directs the Transmit RAM arbiter 416 to read the recipe of modification commands stored in the External Transmit SRAM 412 (assuming the TXMI link is an external recipe link) or Internal Recipe RAM 414 (assuming the TXMI link is an internal recipe link) and store the same in Recipe RAM 418, an on-chip RAM in relation to modification engine 422. It further directs the arbiter 416 to read the data structures associated with the specified internal or external recipe command sequence, and store the same in Data RAM 420, another on-chip RAM in relation to modification engine 422.

The sequencer 410 then awaits an available slot in the pipeline of the modification engine 422. When such is available, the sequencer 410 passes to the engine 422 for placement in the slot a pointer to the recipe as stored in Recipe RAM 418 and other related information.

The sequencer 410 assigns a fragment buffer to the packet. The fragment buffer is a buffer within a plurality of fragment buffers which collectively may be referred to as TX work buffer 436. The modification engine then executes the recipe for the packet or packet burst, through one or more passes through the modification engine pipeline. In one embodiment, the recipe comprises one or more entries, and one or more passes through the pipeline are performed to execute each entry of the recipe.

In the process of executing the recipe, the modification engine 422 stores the modified fragments of the packet in the fragment buffer allocated to the packet in TX work buffer 436. At the same time, the modification engine 422 stores, in ascending order in fragment format RAM 438, pointers to the modified fragments of the packet as stored in the fragment buffer and pointers to the unmodified fragments of the packet as stored in Transmit In Data FIFO 428.

When all the recipe entries have been executed, the modification engine 422 writes an entry to the fragment CAM 440, the entry comprising the PBUS channel over which the packet was received, the sequence number for the packet, the SOP pointer to the packet (as stored in the Transmit In Data FIFO 428), a packet to be filled flag, a packet offset in the Transmit In Data FIFO 428, and the total length of the list of fragments as stored in the fragment format RAM 438. This completes the processing of the packet by the modification engine 422.

Fragment/burst processor 442 assembles the packets for ultimate egress from the system. To prevent packet re-ordering, the fragment/burst processor 442 processes, for each PBUS channel, the packets in the order in which they were received by the modification system 400. More specifically, the fragment/burst processor 442 maintains an expected next sequence number for each PBUS channel, and then performs, in round robin fashion, CAM searches in fragment CAM 440 for an entry bearing the expected next sequence number for the channel. If an entry is found with that sequence number, the fragment/burst processor 442 processes it. If such an entry is not found, the fragment/burst processor 442 takes no action with respect to the channel at that time, and proceeds to process the next channel.

When a fragment CAM entry with the expected next sequence number is located, the fragment/burst processor 442 directs assembler 446 to assemble the packet responsive to the fragment list for the packet as stored in the fragment format RAM 438. In one embodiment, the assembler 446 is a multiplexor, which is directed to multiplex between outputting on second data path 444, responsive to the fragment list, the modified packet fragments as stored in the TX work buffer 436 and the unmodified packet fragments as stored in the Transmit In Data FIFO 428 (as provided to the multiplexor 446 over data path 434). Through this process, the packet is assembled in ascending order on second data path 444. In one embodiment, the second data path 444 has a width less than the width of the first data path 402. In one implementation, the fragment/burst processor 442 outputs the packets over data path 444 in the form of bursts.

The assembled packet is parsed by the third packet parser 448 in the manner described previously. The resultant context pointers and status flags are then passed, along with the packet, for concurrent processing by Transmit Processor Block 452 and Transmit ACL Logic 454.

The Transmit Processor Block 452 performs two main functions. First, it performs egress mark processing by selectively modifying one or more QoS fields in the packet responsive to the egress mark control information from the packet stored by the modification engine in Transmit Post Processor RAM 456. In one example, any of the VLAN VPRI, MPLS EXP, and IPv4/IPv6 TOS fields may be modified through this process utilizing the VPRI/EXP/IPToS RAMs 458 as appropriate. The egress mark control information may be derived from one or more egress mark commands specified by an AFH pre-pended to the packet, or from one or more egress mark commands within a recipe for the packet. Second, it performs OSI Layer 3/Layer 4 checksum calculation or modification.

The Transmit ACL logic 454 conducts a CAM search for the packet in Egress ACL CAM 460 to determine if the packet should be killed, a copy sent to the host, or mirrored to the egress mirror FIFO 140. The packet then exits the packet modification system 400 through the egress portion 462 of the system 400, and is output onto PBUS 464.

Figure 5:
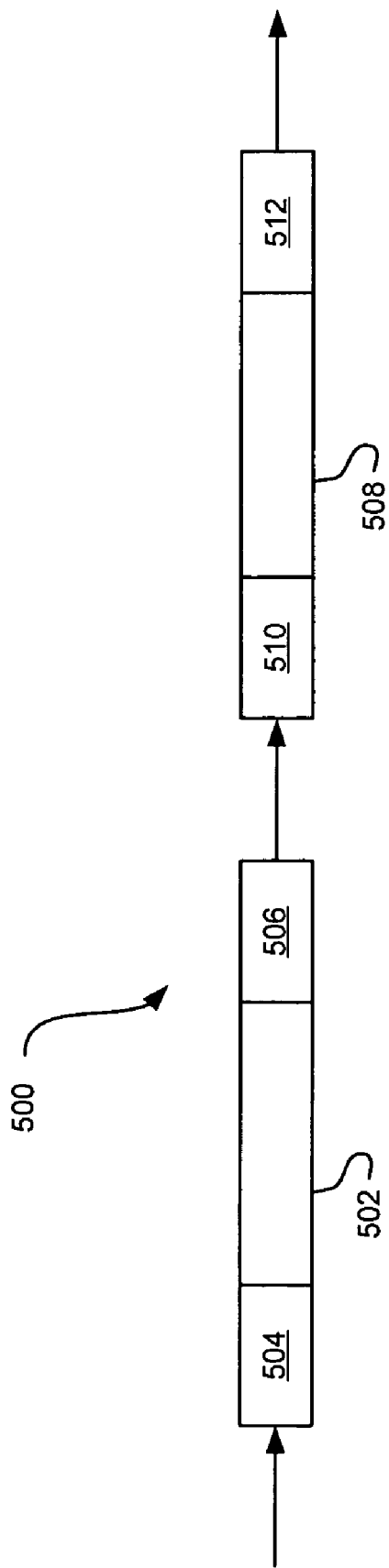
FIG. 5 is a block diagram of an embodiment of a cascade of multiple packet processing systems.

FIG. 5 illustrates a cascaded combination 500 of multiple, replicated packet systems, each of which is either a packet classification system or a packet modification system. In one embodiment, the cascaded combination comprises a first one 502 of the replicated packet systems having ingress and egress portions, identified respectively with numerals 504 and 506, and a second one 508 of the replicated packet systems having ingress and egress portions, identified respectively with numerals 510 and 512.

In this embodiment, the egress portion 506 of the first packet system 502 is coupled to the ingress portion 510 of the second packet system 508. Moreover, the first one 502 of the replicated packet systems is configured to perform partial processing of a packet, either classification or modification processing as the case may be, and the second one 508 of the replicated packet systems is configured to complete processing of the packet.

In one configuration, packet system 508 forms the last one of a plurality of systems in the cascaded combination, and packet system 502 forms either the first or the next to last one of the systems in the cascaded combination.

In one example, each of the replicated systems performs a limited number of processing cycles, and the number of replicated systems is chosen to increase the number of processing cycles to a desired level beyond that achievable with a single system.

In a second example, a complete set of processing functions or tasks is allocated amongst the replicated systems. In one configuration, a first replicated system is allocated ACL and QoS classification processing tasks, and a second replicated system is allocated PTI/TXMI classification processing tasks.

Figure 6:
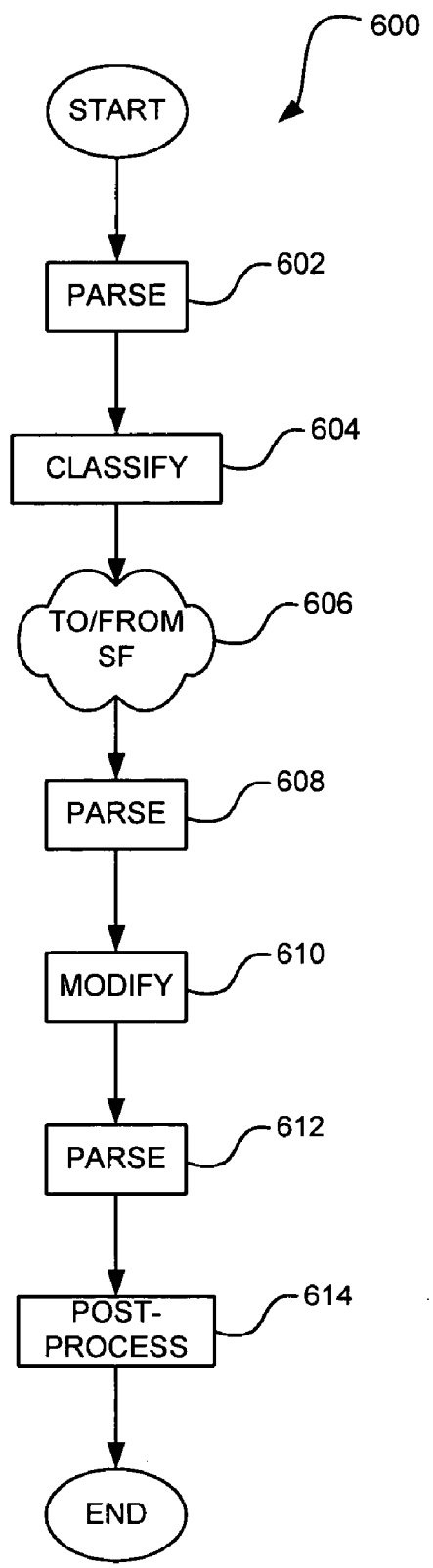
FIG. 6 is a flowchart of an embodiment of method of processing a packet which comprises multiple parsing steps.

FIG. 6 is a flowchart of one embodiment 600 of a method of processing a packet. In this embodiment, the method comprises step 602, parsing a packet and providing first data representative thereof, and step 604, classifying the packet responsive to the first data.

In step 606, the packet is forwarded to and received from switching fabric, which may perform additional processing of the packet. Step 608 comprises parsing the packet received from the switching fabric (which may be the packet forwarded to the switching fabric, or a packet derived therefrom), and providing second data representative thereof.

Step 610 comprises modifying the packet responsive to the second data, and step 612 comprises parsing the modified packet and providing third data representative thereof. Step 614 comprises post-processing the modified packet responsive to the third data.

In one embodiment, the packet undergoing processing has a plurality of encapsulation layers, and each of the first, second and third parsing steps 602, 608, 612 comprising providing context pointers pointing to the start of one or more of the encapsulated layers of the packet.

In a second embodiment, the packet undergoing processing comprises a first packet forming the payload portion of a second packet, each of the first and second packets having a plurality of encapsulation layers, and each of the first, second and third parsing steps 602, 608, 612 comprises providing context pointers pointing to the start of one or more of the encapsulated layers of the first packet and one or more of the encapsulated layers of the second packet.

In one implementation, the post-processing step comprises computing a checksum for the modified packet. In a second implementation, the post-processing step comprises egress marking of the packet. In a third implementation, the post-processing step comprises the combination of the foregoing two implementations.

Figure 7:
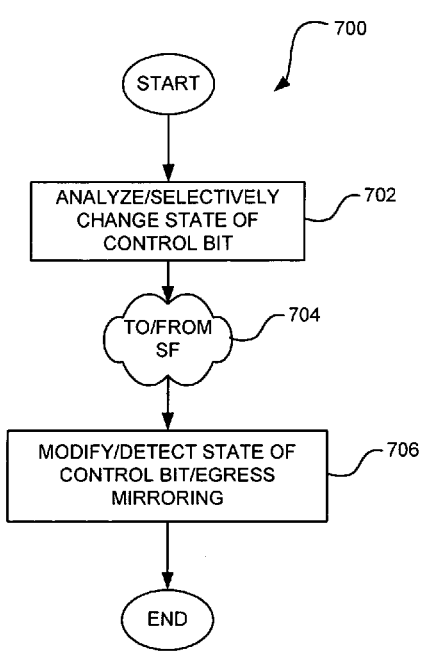
FIG. 7 is a flowchart of an embodiment of a method of performing egress mirroring of a packet.

FIG. 7 is a flowchart of a second embodiment 700 of a method of processing a packet. In this embodiment, step 702 comprises analyzing a packet in a packet classification system and, responsive thereto, selectively changing the state of a control bit from a first state to a second state. Step 704 comprises forwarding the packet to and from switching fabric. Step 706 comprises modifying, in a packet modification system, the packet received from the switching fabric (either the packet forwarded to the switching fabric, or a packet derived there-from), detecting the control bit to determine if egress mirroring of the modified packet is activated, and if so, providing a copy of the modified packet to the packet classification system.

In one implementation, the control bit is associated with the packet received from the switching fabric. In one example, the control bit is in a packet header pre-pended to the packet received from the switching fabric.

Figure 8:
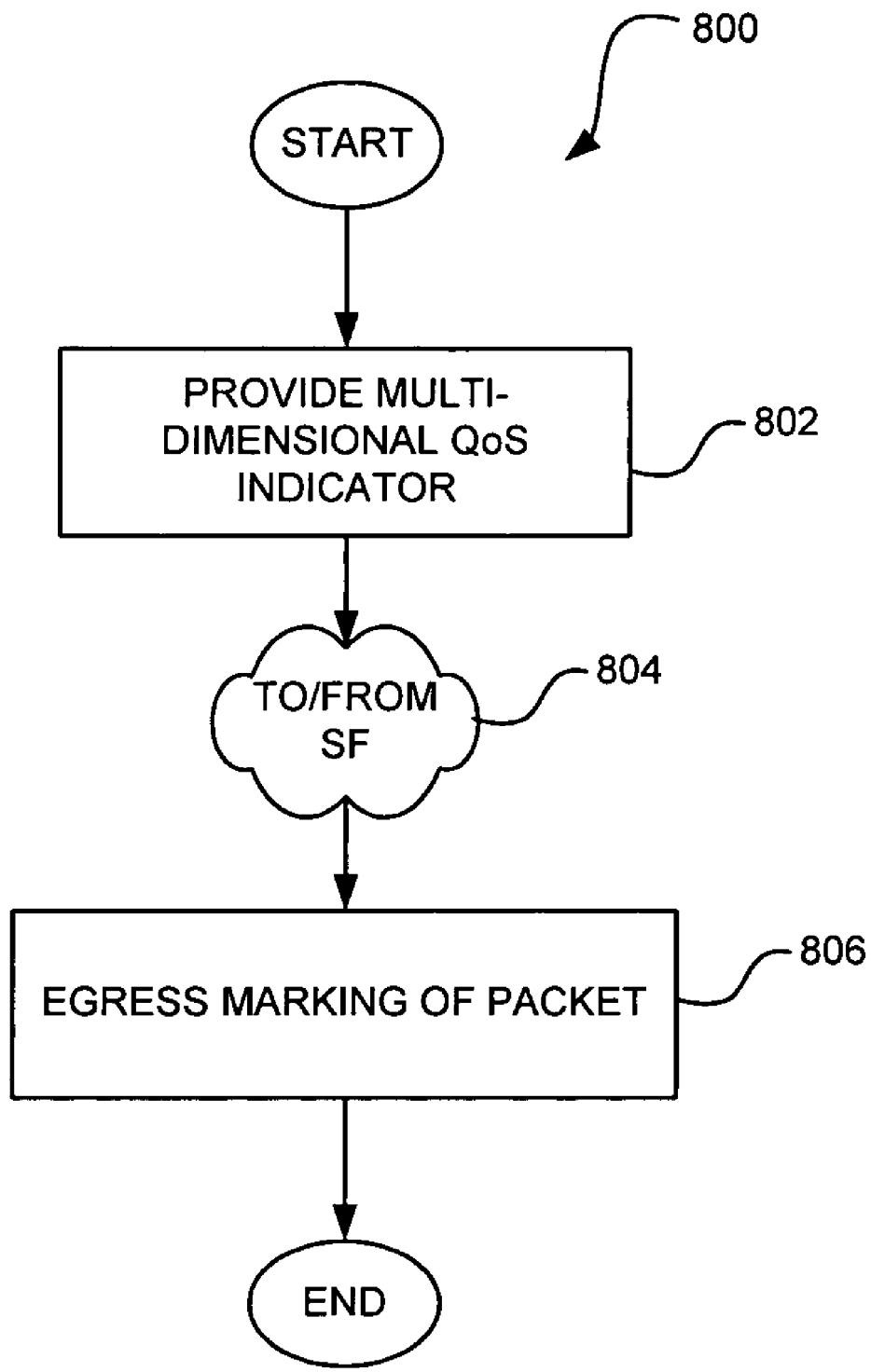
FIG. 8 is a flowchart of an embodiment of a method of performing egress marking of a packet.

FIG. 8 is a flowchart of a third embodiment 800 of a method of processing a packet. Step 802 comprises providing a multi-dimensional quality of service (QoS) indicator for a packet. Step 804 comprises forwarding the packet to and from switching fabric. Step 806 comprises egress marking of the packet received from the switching fabric (either the packet forwarded to the switching fabric, or a packet derived therefrom), responsive to at least a portion of the multi-dimensional QoS indicator.

In one implementation, step 806 comprises selectively modifying one or more quality of service fields within the packet received from the switching fabric responsive to at least a portion of the multi-dimensional quality of service indicator.

In one configuration, the multi-dimensional quality of service indicator comprises an ingress quality of service indicator, an egress quality of service indicator, and packet marking control information, and step 806 comprises selectively modifying one or more quality of service fields within the packet received from the switching fabric responsive to the packet marking control information. In one example, the multi-dimensional quality of service indicator further comprises a host quality of service indicator.

In one embodiment, the method further comprises utilizing the ingress quality of service indicator as an ingress queue select. In a second embodiment, the method further comprises utilizing the egress quality of service indicator as an egress queue select. In a third embodiment, the method further comprises utilizing the host quality of service indicator as an ingress queue select for a host.

Figure 9:
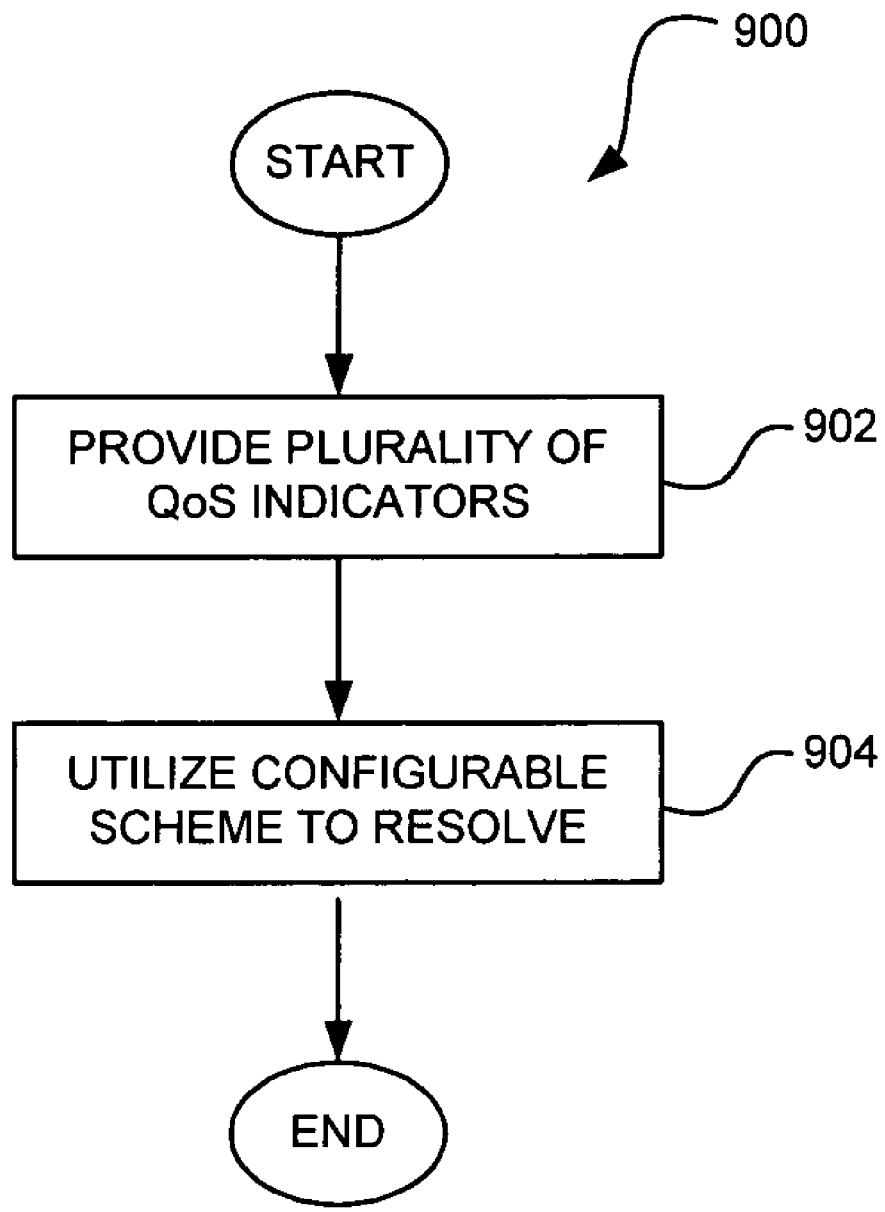
FIG. 9 is a flowchart of an embodiment of a method of resolving a plurality of quality of service (QoS) indicators for a packet utilizing a configurable priority resolution scheme.

FIG. 9 is a flowchart of an embodiment 900 of assigning a quality of service indicator to a packet. In this embodiment, step 902 comprises providing a plurality of quality of service indicators for a packet, each with an assigned priority, and step 904 comprises utilizing a configurable priority resolution scheme to select one of the plurality of quality of service indicators for assigning to the packet.

In one implementation, step 902 comprises mapping one or more fields of the packet into a quality of service indicator for the packet and an associated priority. In a second implementation, step 902 comprises performing a search to obtain a quality of service indicator for the packet and an associated priority. A third implementation comprises a combination of the foregoing two implementations.

Figure 10:
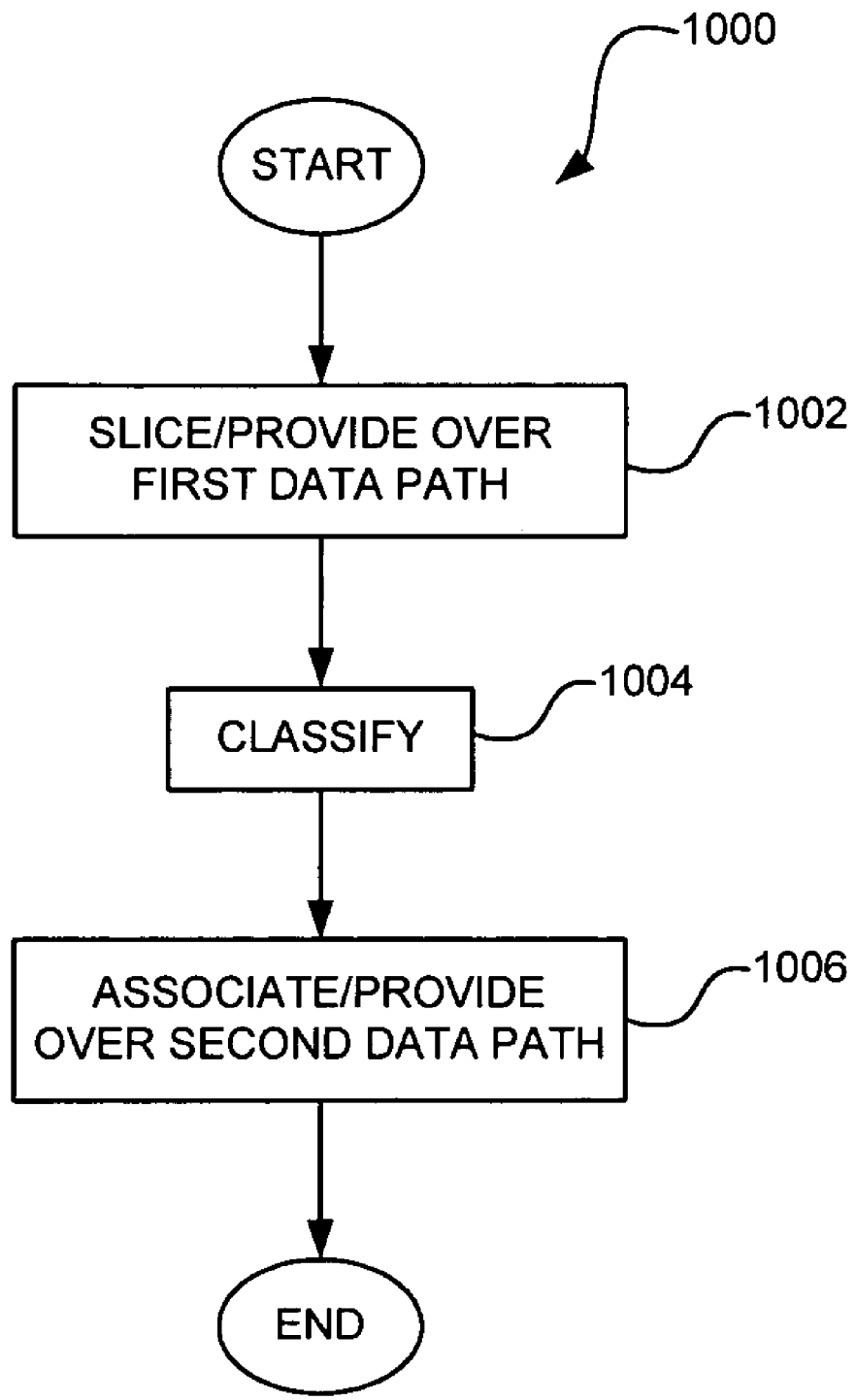
FIG. 10 is a flowchart of an embodiment of a method of classifying a packet in which sliced packet data is provided to a packet classification engine over a wide data path.

FIG. 10 is a flowchart of an embodiment 1000 of a method of classifying a packet. In this embodiment, step 1002 comprises slicing some or all of a packet into portions and providing the portions in parallel over a first data path having a first width to a classification engine. Step 1004 comprises classifying, in the packet classification engine, the packet responsive to the packet portions received over the first data path and providing data representative of the packet classification. Step 1006 comprises associating the data representative of the packet classification with the packet to form an associated packet, and providing the associated packet over a second data path having a second width less than the first width.

In one implementation, the step of providing the packet portions over the first data path comprises providing each of the bits of some or all of the packet in parallel over the first data path to the classification engine.

In a second implementation, the associating step comprises multiplexing the data representative of the packet classification and some or all of the packet onto the second data path.

Figure 11:
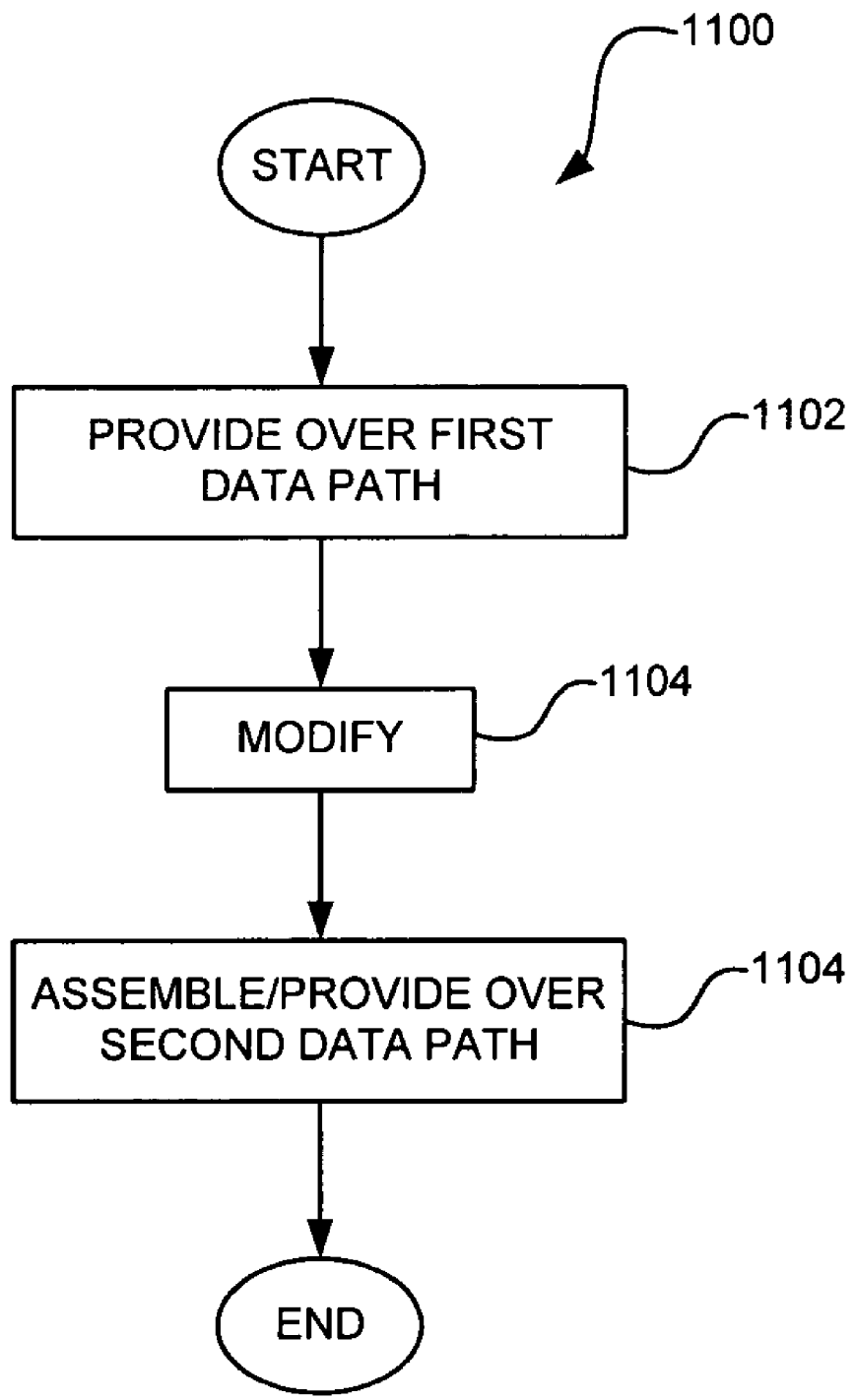
FIG. 11 is a flowchart of an embodiment of a method of modifying a packet in which sliced packet data is provided to a packet modification engine over a wide data path.

FIG. 11 is a flowchart of an embodiment 1100 of a method of modifying a packet. Step 1102 comprises providing some or all of a packet as packet portions and providing the portions in parallel over a first data path having a first width to a modification engine. Step 1104 comprises modifying, in the modification engine, one or more of the packet portions. Step 1106 comprises assembling a packet from the one or more modified and one or more unmodified packet portions, and providing the assembled packet over a second data path having a second width less than the first width.

Figure 12:
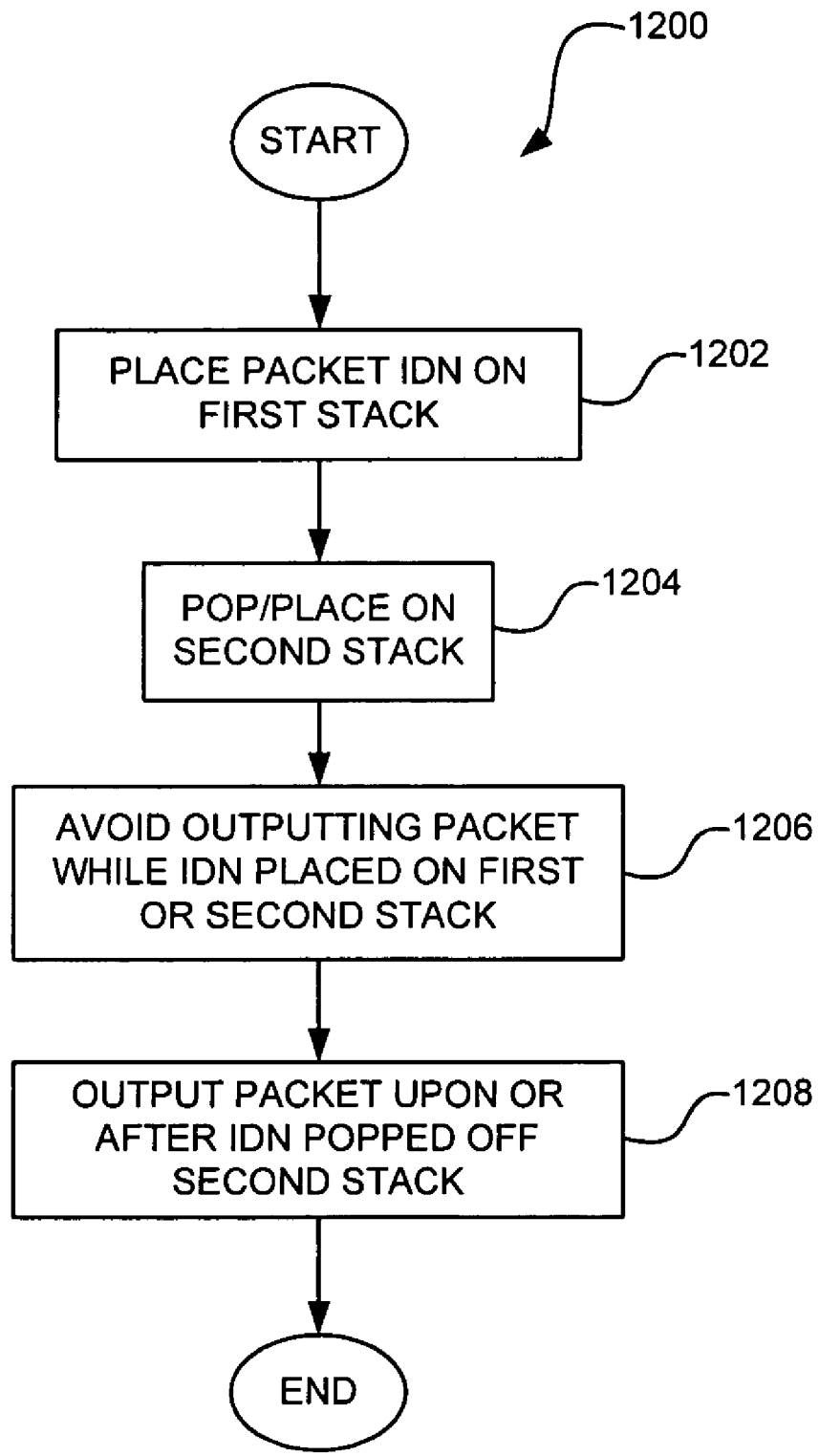
FIG. 12 is a flowchart of an embodiment of a method of controlling packet classification processing of a packet through first and second stacks.

FIG. 12 is a flowchart 1200 of an embodiment of a method of classifying a packet. Step 1202 comprises placing an identifier of a packet on a first FIFO buffer. Step 1204 comprises popping the identifier off the first FIFO buffer and placing it on a second FIFO buffer upon or after initiation of classification processing of the packet. Step 1206 comprises avoiding outputting the packet while an identifier of the same is placed on either the first or second FIFO buffers. Step 1208 comprises outputting the packet upon or after the identifier of the packet has been popped off the second FIFO buffer.

Figure 13:
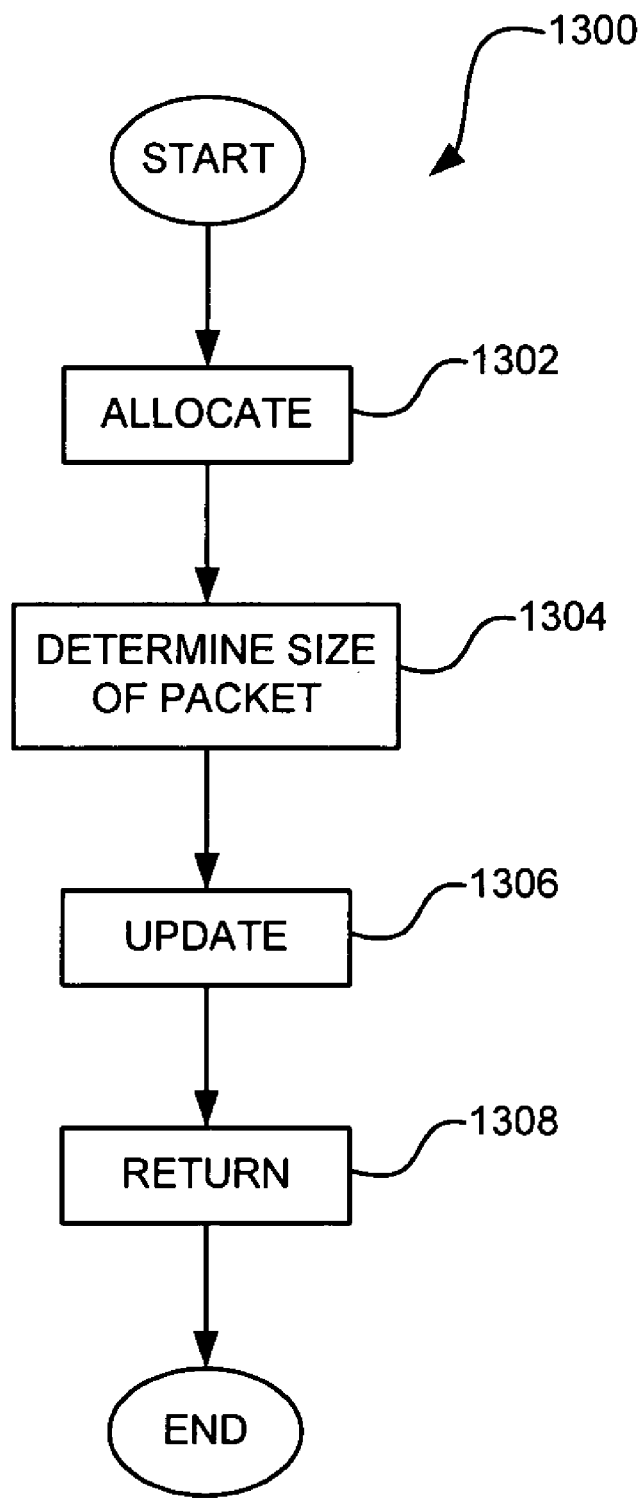
FIG. 13 is a flowchart of an embodiment of a method of maintaining packet statistics which involves allocating a packet size determiner to a packet from a pool of packet size determiners.

FIG. 13 is a flowchart illustrating an embodiment 1300 of a method of maintaining packet statistics. Step 1302 comprises allocating a packet size determiner to a packet from a pool of packet size determiners. Step 1304 comprises using the packet size determiner to determine the size of the packet. Step 1306 comprises updating one or more packet statistics responsive to the determined size of the packet. Step 1308 comprises returning the packet size determiner to the pool upon or after the same has determined the size of the packet.

In one implementation, the packet size determiner is a counter that counts the size of the packet. In a second implementation, the method further comprises queuing one or more statistics update requests.

In one implementation example, the one or more packet statistics indicate the cumulative size of packets which have met specified processing conditions or hits, and step 1306 comprises incrementing a cumulative size statistic for a particular processing condition or hit by the determined size of the packet if the packet meets that particular processing condition or hit.

Figure 14:
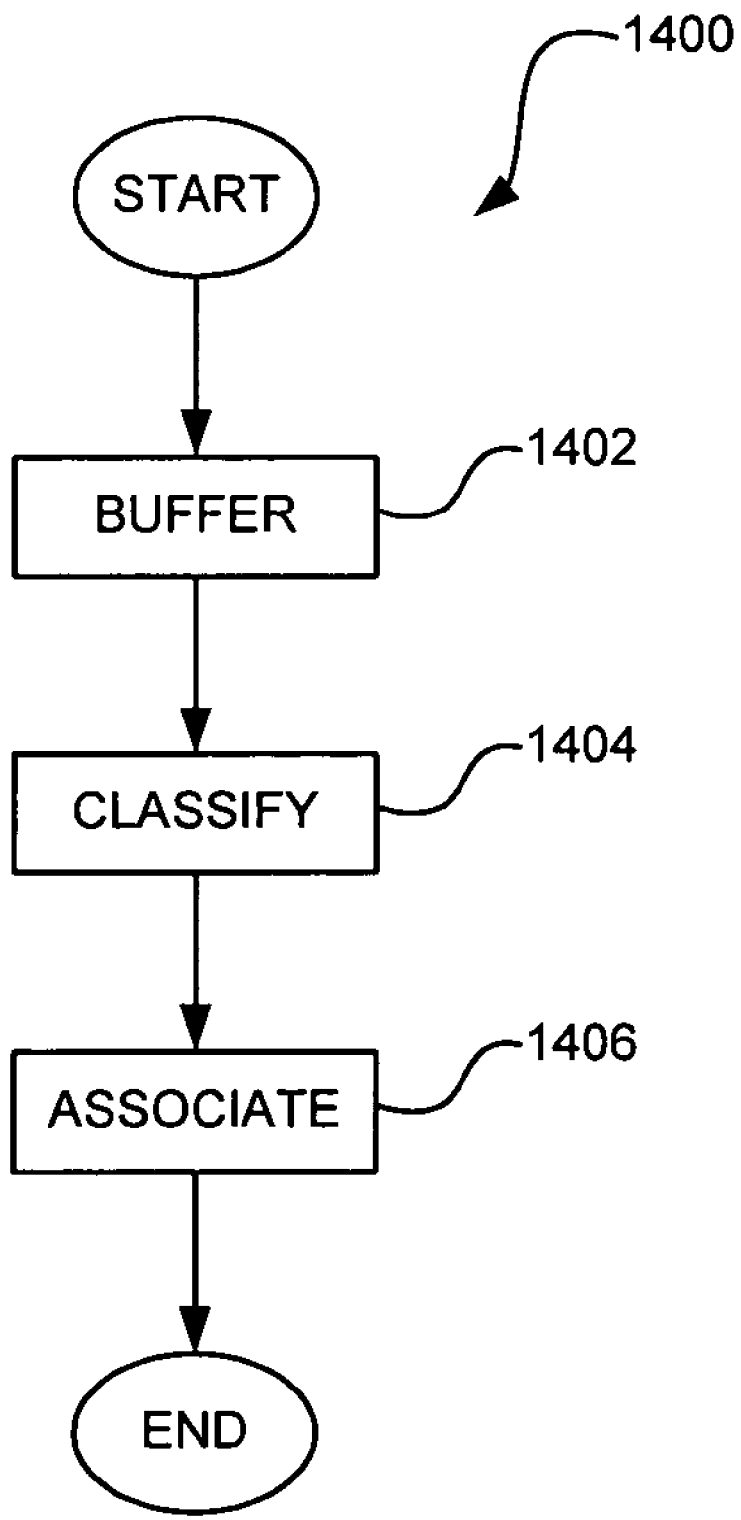
FIG. 14 is a flowchart of an embodiment of a method of classifying a packet which involves buffering the packet in a buffer upon or after ingress thereof, and associating packet classification data with the packet as retrieved directly from the buffer to form a classified packet on an egress data path.

FIG. 14 illustrates an embodiment 1400 of a method of classifying a packet. Step 1402 comprises buffering a packet in a buffer upon or after ingress thereof. Step 1404 comprises classifying the packet and providing data representative of the packet classification. Step 1406 comprises associating the data representative of the packet classification with some or all of the packet as directly retrieved from the buffer to form a packet on an egress data path.

In one implementation, step 1406 comprises multiplexing the data representative of the packet classification onto a data path followed by some or all of the packet as directly retrieved from the buffer.

Figure 15:
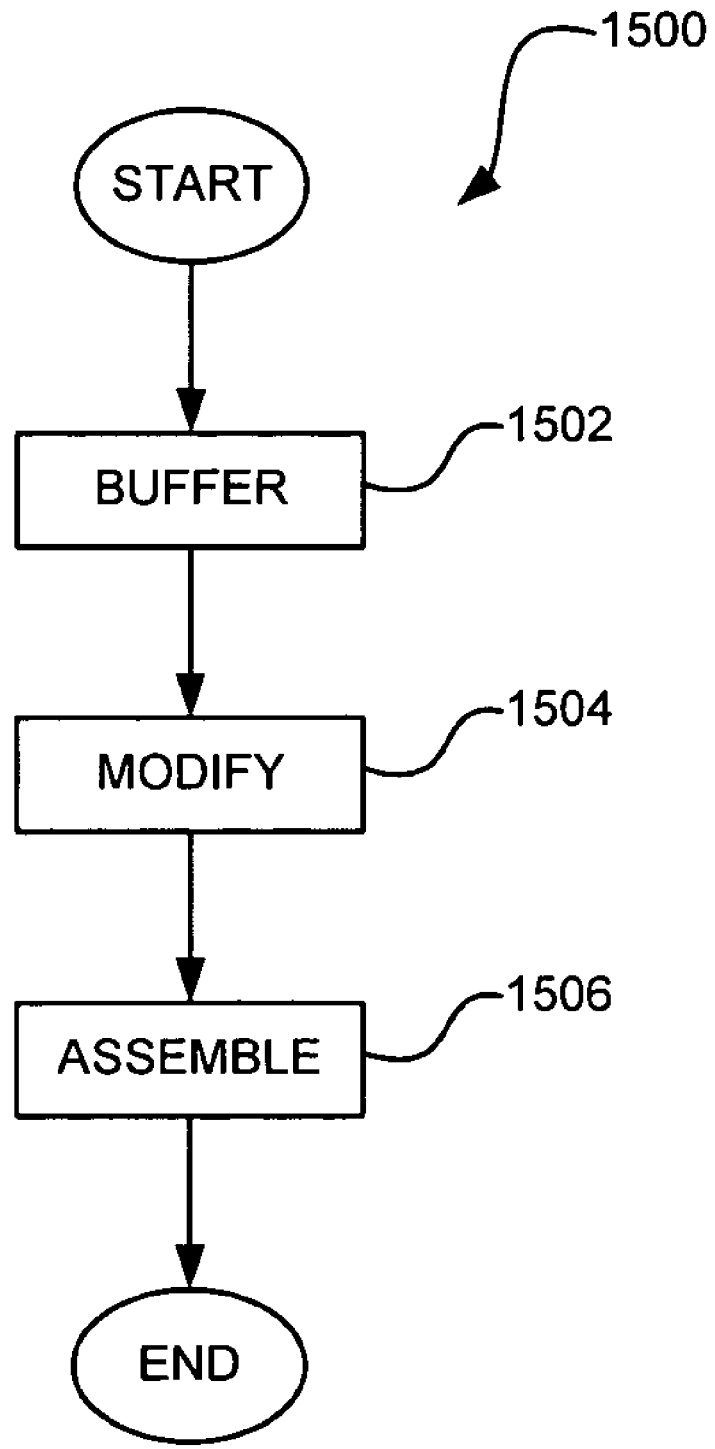
FIG. 15 is a flowchart of an embodiment of a method of modifying a packet which involves buffering the packet in a buffer upon or after ingress thereof, and assembling a packet on an egress data path from one or more modified portions of the packet, and one or more unmodified portions as retrieved directly from the buffer.

FIG. 15 illustrates an embodiment 1500 of a method of modifying a packet. Step 1502 comprises buffering the packet in a buffer upon ingress thereof. Step 1504 comprises modifying one or more portions of the packet. Step 1506 comprises assembling the one or more modified portions of the packet with one or more unmodified portions of the packet as retrieved directly from the buffer to form an assembled packet on an egress data path.

In one implementation, the method comprises providing a list indicating which portions of the assembled packet are to comprise modified portions of an ingress packet, and which portions are to comprise unmodified portions of the ingress packet, and step 1506 comprises assembling the assembled packet responsive to the list.

Figure 16:
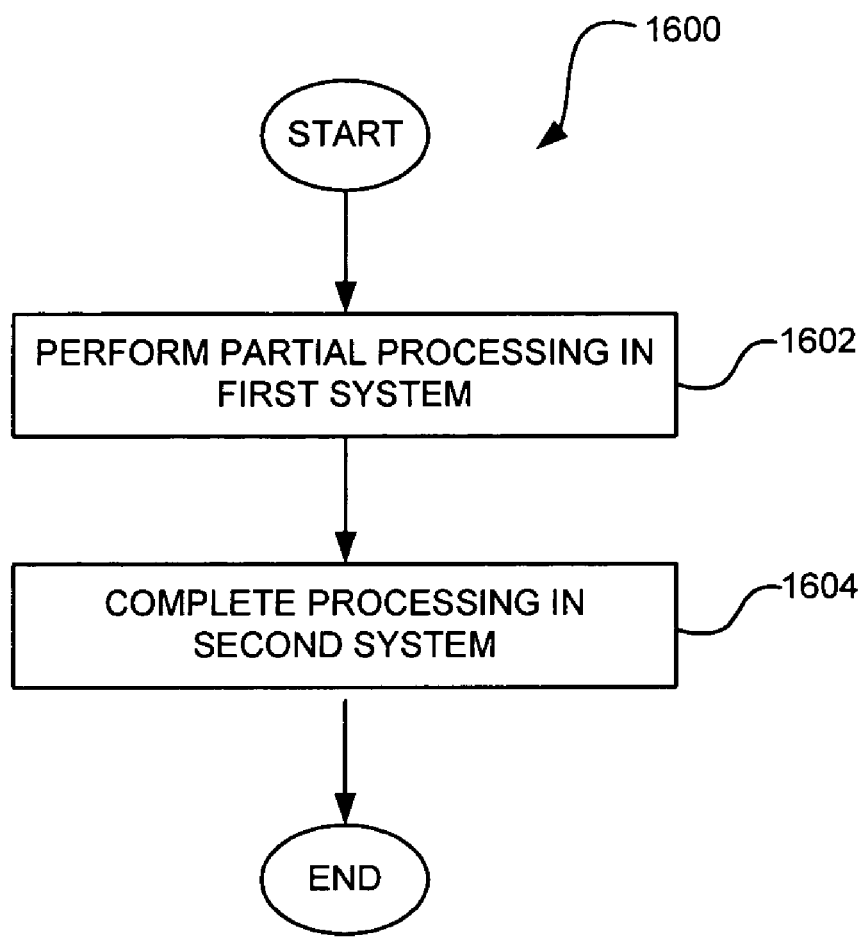
FIG. 16 is a flowchart of an embodiment of a method of performing classification processing of a packet in a cascaded combination of multiple, replicated packet classification systems.

FIG. 16 illustrates an embodiment 1600 of a method of processing a packet in a cascaded combination of multiple, replicated packet processing systems. In one implementation, each of systems is either a packet classification system or a packet modification system, and the processing which is performed by each system is either classification processing or modification processing as the case may be. Step 1602 comprises performing partial processing of a packet in a first of the replicated packet processing systems, and step 1604 comprises completing processing of the packet in a second of the replicated packet processing systems.

In one implementation, the second packet processing system is the last of a plurality of replicated packet processing systems, and the first packet processing system is either the first or next to last packet processing system in the plurality of packet processing systems, wherein partial processing of a packet is performed in the first replicated packet processing system, and processing is completed in the second replicated packet processing system.

Figure 17:
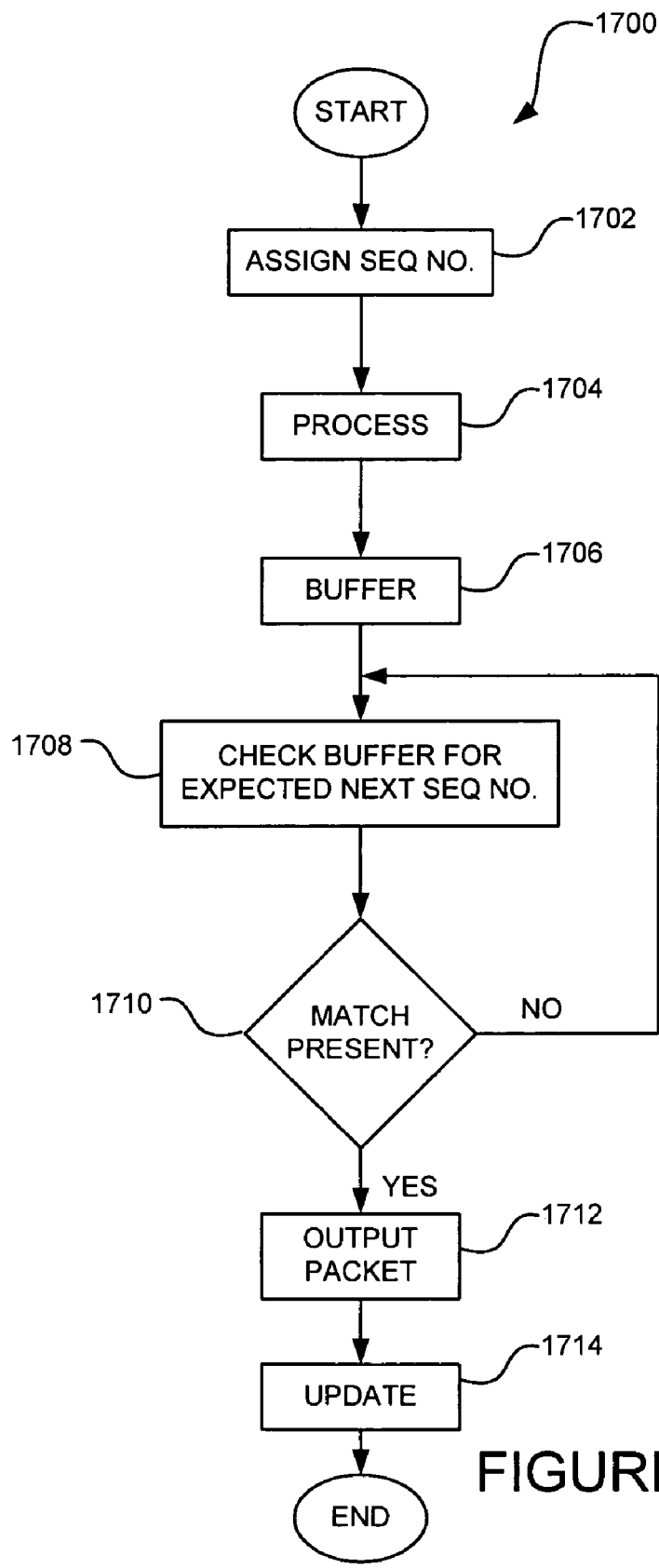
FIG. 17 is a flowchart of an embodiment of a method of preventing re-ordering of packets in a packet processing system.

FIG. 17 illustrates an embodiment 1700 of a method of preventing re-ordering of packets in a packet processing system. Step 1702 comprises assigning a sequence number to a packet upon or after ingress thereof to the system. Step 1704 comprises processing the packet. Step 1706 comprises storing data representative of the packet in a buffer. Step 1708 comprises checking the buffer for an entry matching an expected next sequence number. Inquiry step 1710 comprises determining if a match is present. If so, steps 1712 and 1714 are performed. Step 1712 comprises outputting the corresponding packet, and step 1714 comprises updating the expected next sequence number to reflect the outputting of the packet. If not, the method loops back to step 1708, thus deferring outputting a packet if a match is not present.

In one implementation, steps 1708-1714 comprise maintaining an expected next sequence number for each of a plurality of output channels, checking the buffer for a match for each of the channels, outputting the corresponding packet on a channel if a match for that channel is present and updating the expected next sequence number for that channel, and deferring outputting a packet on a channel if a match for that channel is not present.

Preferred Embodiments of the Invention

Figure 18:
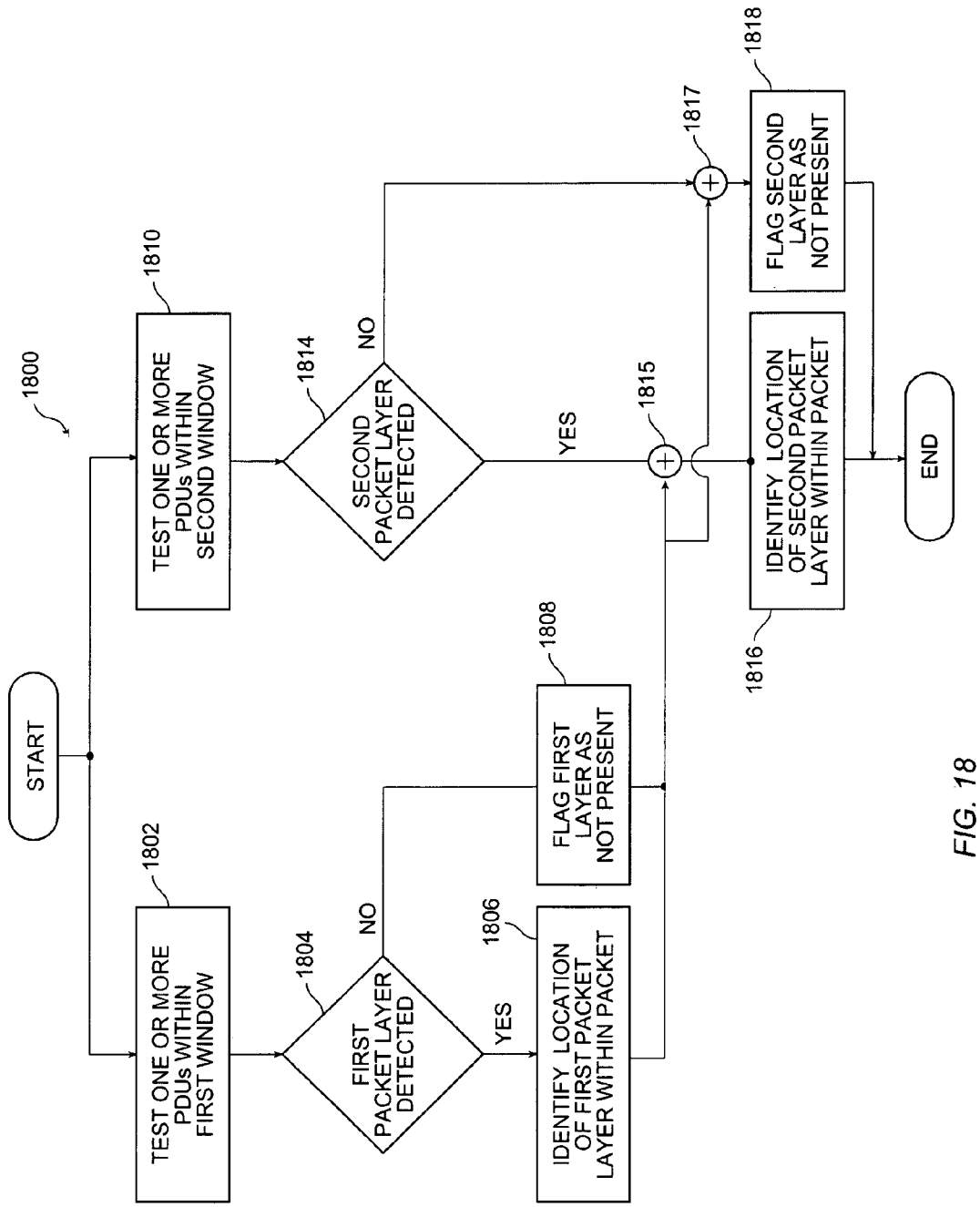
FIG. 18 is an embodiment of a method of parsing a packet, in which first and second testing steps occur at least partly in parallel, and utilize respectively utilize first and second windows that overlap at least in part.
Figure 19:
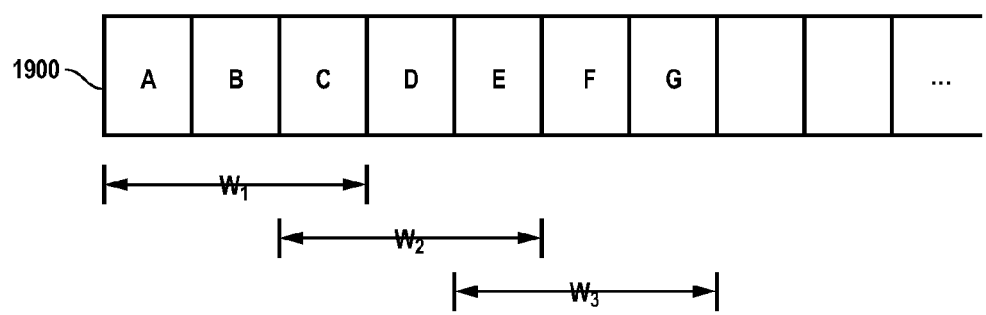
FIG. 19 illustrates an example of the packet data units (PDUs) forming a packet, and the windows utilized in the various testing steps occurring during the parsing of the packet.

FIG. 18 is a flowchart of an embodiment comprising a method 1800 of parsing a packet. In this method, the packet is assumed to comprise a plurality of packet data units (PDUs) and a plurality of packet layers, each having locations with the packet. The method begins with step 1802, which comprises testing one or more of the packet data units within a first window for the presence of a first packet layer. In one implementation, this testing comprises comparing the data of the PDUs with predetermined headers or tags characteristic of the first packet layer. Thus, in FIG. 19, referring to the PDUs of packet 1900 as a, b, c, etc., an example of this step comprises testing the three PDUs a, b, and c (the three PDUs within the window $W_1$) for the presence of a first packet layer.

Turning back to FIG. 18, testing step 1810 is performed at least partially in parallel with testing step 1802. In testing step 1810, one or more of the packet data units within a second window are tested for the presence of a second packet layer. This second window at least partially overlaps the first window to account for the uncertainty in the location of the second packet layer and to ensure that it is not missed. In one implementation, as with testing step 1802, testing step 1810 comprises comparing the data in the PDUs within the second window with predetermined headers or tags characteristic of the second layer. In one example, illustrated in FIG. 19, testing step 1810 comprises testing the three PDUs c, d, e within the second window $W_2$ for the presence of the second layer. As illustrated, in this example, this second window $W_2$ overlaps the first window $W_1$ at the PDU c.

Turning back to FIG. 18, in query step 1804, the method queries whether the first packet layer has been detected within the first window. If so, step 1806 is performed. If not, step 1808 is performed. In step 1806, the method identifies the location of the first packet layer within the packet. In step 1808, the method sets a flag indicating that the first layer is not present within the packet.

In one implementation, step 1806 comprises identifying the location of the first packet by forming a pointer pointing to the location of the first layer within the packet. In one example, the pointer is configured to point to the beginning of the first layer in the packet. Also, the pointer may be expressed in absolute or relative terms, e.g., relative to the beginning of the packet.

In query step 1814, the method queries whether the second layer has been detected in the second window. If so, a branch is made to AND node 1815. If not, a branch is made to AND node 1817. The AND nodes 1815 and 1817 defer final identification of the second layer within the packet (or final determination that the second layer is absent from the packet) until final identification of the first layer within the packet has occurred (or final determination that the first layer is absent from the packet). These actions are deferred because accurate identification of the location of the second layer (or accurate determination that the second layer is absent) sometimes depends on accurate identification of the location of the first layer (or accurate determination that the second layer is absent). For example, the second layer may begin a predetermined number of bytes after the first layer, and deferring final identification of the location of the second layer in this embodiment (or final determination that the second layer is absent in this embodiment) allows a more accurate identification of the location of that layer (or more accurate determination that the second layer is absent).

The AND node 1815 ensures that the final identification of the location of the second layer within the packet is deferred until the location of the first layer within the packet has been finally identified (or it has been finally determined that the first layer is absent from the packet). Once either of these events has occurred, step 1816 is performed. In step 1816, the location of the second layer within the packet is finally identified. In one implementation, the location of the second layer within the packet is identified through formation of a pointer pointing to the second layer. In one example, the pointer points to the beginning of the second layer. As with the pointer to the first layer, the pointer may be expressed in absolute or relative terms.

The AND node 1817 ensures that the final determination that the second layer is absent from the packet is deferred until the location of the first layer within the packet has been finally identified (or it has been finally determined that the first layer is absent from the packet). Once either of these events has occurred, step 1818 is performed. In step 1818, a final determination is made that the second layer is absent from the packet.

The PDUs making up the packet may be of uniform or varying size. In one implementation, they are of a predetermined, uniform size, e.g., 64 bits. Also, the manner of identifying the first and second layers in the packet may comprise forming data identifying, respectively, the first and second layers. In one example, the data represents pointers pointing, respectively, to the first and second layers. In a more specific example, the pointers identify, respectively, the beginning of the first and second layers.

The method may also comprise testing for the presence of (and identifying if present) additional layers in the packet beyond the first and second layers. For example, in one embodiment, the method comprises testing for the presence of a third packet layer. In this embodiment, this testing occurs at least partially in parallel with either or both testing steps 1802, 1810, and involves the testing of PDUs within a third window that at least partially overlaps the second window. For example, in FIG. 19, this third testing step may comprise testing the three PDUs e, f and g within the third window $W_3$ that overlaps the second window $W_2$ at PDU e. If testing for the presence of the third layer is performed, the final identification of the location of the third layer in this embodiment (or final determination that the third layer is absent from the packet) is deferred until the location of the second layer has been finally identified (or it has been finally determined that the second layer is absent). One of skill in the art would appreciate that the method may also be extended to the testing of four or more packet layers.

The windows utilized for the various testing steps may be of uniform or varying sizes. Moreover, these windows may overlap adjacent windows on one or both sides. These windows may also overlap adjacent windows in fixed or varying amounts. In one implementation, the windows are of a fixed, uniform size, and overlap adjacent windows by a uniform, fixed amount. The windows also need not be an integral multiple of PDUs. In one example, in which a PDU is 8 bytes in length, each window is 15 bytes in width, and overlaps the adjacent window on the right by 7 bytes. In this example, the first testing step comprises testing for the presence of a first layer in a first PDU and the seven bytes of the immediately adjacent second PDU to its right, and the second testing step comprises testing for the presence of a second layer in this second PDU and the seven bytes of the immediately adjacent third PDU to its right. A third testing step, if present, comprises testing for the presence of a third layer in a third PDU and the seven bytes of the immediately adjacent fourth PDU to its right.

In one application, the packet is the outer packet of an embedded packet comprising a first inner packet forming the payload portion of a second outer packet. In this application, data identifying the presence of the layer in the packet may be expressed in relation to the beginning of the outer packet. In a second application, the packet is the inner packet of such an embedded packet. In this application, data identifying the presence of the layer in the packet may be expressed in relation to the beginning of the inner packet.

The foregoing method, or any of the variants, implementations, or examples thereof that have been discussed, may be tangibly embodied as a sequence of software instructions stored on a processor readable medium.

Figure 20:
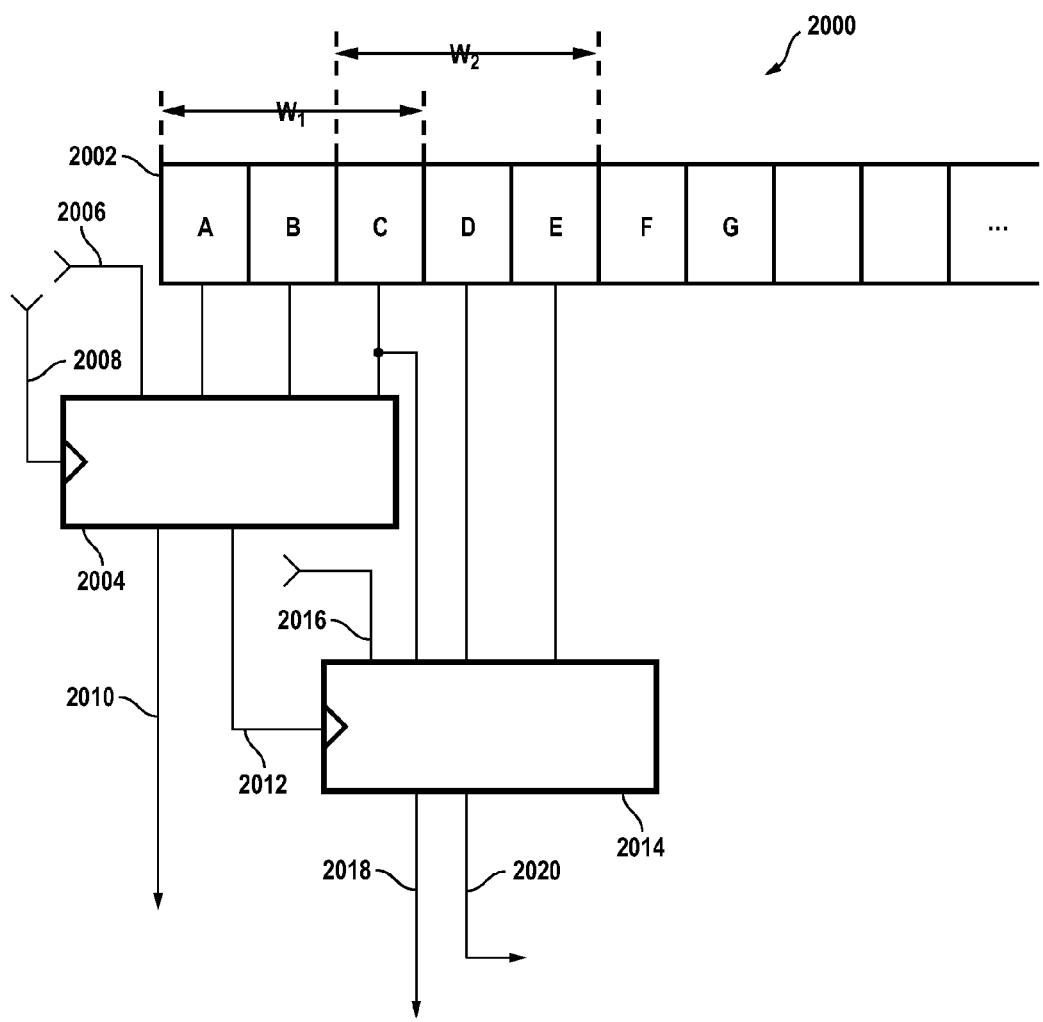
FIG. 20 is a block diagram of a system for parsing a packet, comprising a buffer for buffering the PDUs of the packet, and first and second stages for testing the packet for the presence of packet layers.

FIG. 20 illustrates an embodiment of a system 2000 for parsing a packet. In this system, the packet comprises a plurality of PDUs and a plurality of packet layers, each having locations within the packet. In this embodiment, the system comprises a buffer 2002 for buffering a plurality of the PDUs, identified in the figure with a, b, c, etc., a first stage 2004 for testing one or more of the buffered PDUs within a first window for the presence of a first packet layer, and a second stage 2014 for testing one or more of the buffered PDUs within a second window for the presence of a second packet layer.

In this embodiment, the first stage 2004 is configured to identify the location of the first packet layer within the packet if the first packet layer is detected within the first window; and a second stage 2014 is configured to identify the location of the second packet layer within the packet if the second packet layer is detected within the second window.

Moreover, the second stage 2014 in this embodiment is configured to operate at least partly in parallel with the first stage 2004. In one example, the second stage 2014 tests for the presence of the second layer within the second window while the first stage 2004 tests for the presence of the first layer within the first window.

Also, the second window in this embodiment at least partly overlaps the first window. Given the uncertainty in the location of the second layer (at least until the first layer has been located), this overlap helps ensure that the second layer is not inadvertently missed.

In one embodiment, the first stage 2004 is configured to test for the presence of the first layer by comparing the PDUs within the first window with one or more headers or tags characteristic of the first layer. These one or more headers or tags are input to the first stage over one or more signal lines, identified in the figure with numeral 2006.

As a result of this comparison, the first stage 2004 makes a determination that the first layer is either present in the packet or absent from the packet. If it is determined that the first layer is present in the packet, the first stage 2004 identifies the location of the first layer within the packet. If it is determined that the first layer is absent from the packet, the first stage 2004 sets a flag to indicate this.

After a suitable settling time, a clock pulse is received over signal line 2008, signaling the first stage 2004 to latch the results of this process. If the first layer is present in the packet, the location of the first layer within the packet is latched. If the first layer is absent from the packet, a flag indicating this is latched. The latched information in the first stage 2004 is presented over the one or more signal lines 2010. Moreover, a signal indicating that a final determination has been made regarding the presence or absence of the first layer in the packet is provided over signal line 2012, which forms the latching clock input to second stage 2014. That bars the second stage 2014 from making a final determination regarding the presence or absence of a second layer within the packet until the first stage 2004 has completed this task in relation to the first layer.

In one embodiment, the second stage 2014 is configured to test for the presence of the second layer by comparing the PDUs within the second window with one or more headers or tags characteristic of the second layer. These one or more headers or tags are input to the second stage over one or more signal lines, identified in the figure with numeral 2016.

As a result of this comparison, the second stage 2014 determines that the second layer is either present in the packet or absent from the packet. If it is determined that the second layer is present in the packet, the second stage 2014 identifies the location of the second layer within the packet. If it is determined that the second layer is absent from the packet, the second stage 2014 sets a flag to indicate this.

Once a final determination has been made by the first stage that the first layer is present in or absent from the packet, a clock pulse is received over signal line 2012, signaling the second stage 2014 to latch the results of the process of testing for the presence of the second layer. If the second layer is present in the packet, the location of the second layer within the packet is latched. If the second layer is absent from the packet, a flag indicating this is latched. The latched information in the second stage 2014 is presented over the one or more signal lines 2018. Moreover, a signal indicating that a final determination has been made regarding the presence or absence of the second layer in the packet is provided over signal line 2020, which may form the latching clock input to subsequent stages.

In one implementation, each of the first and second stages 2004, 2014 are implemented as software executing on a processor. In a second implementation, each of these stages is implemented as hardware. In a third implementation, each of these stages is implemented as a combination of hardware and software.

In one embodiment, the first stage 2004 is configured to identify the location of the first packet layer by forming first data identifying the location of that packet layer, and the second stage 2014 is configured to identify the location of the second packet layer by forming second data identifying the location of that packet layer. In one example, the first data identifies the beginning of the first packet layer, and the second data identifies the beginning of the second packet layer.

In one application, the packet is the outer packet of an embedded packet comprising a first inner packet forming the payload portion of a second outer packet, and the first and second stages are respectively configured to test for the presence of the first and second packet layers in, respectively, the outer packet. In a second application, the packet is the inner packet of an embedded packet, and the first and second stages are respectively configured to test for the presence of the first and second packet layers in, respectively, the inner packet.

In the particular example illustrated, the first stage 2004 is shown testing for the presence of the first layer in three PDUs a, b, and c within a first window $W_1$, and the second stage 2014 is shown testing for the presence of the second layer is three PDUs c, d, and e within a second window $W_2$ overlapping the first window $W_1$ at PDU c, but it should be appreciated that nothing in this particular example should be taken as limiting. In particular, as one of skill in the art would appreciate, examples are possible where the size of the PDUs making up the packet is a fixed, uniform value or alternatively is a value that varies by PDU; where the windows are expressed in terms of integral or fractional multiples of PDUs; where the windows are fixed, uniform sizes or varying sizes; where the windows overlap adjacent windows by fixed amounts or varying amounts; or where the windows overlap either or both adjacent windows on the right and left.

Figure 21:
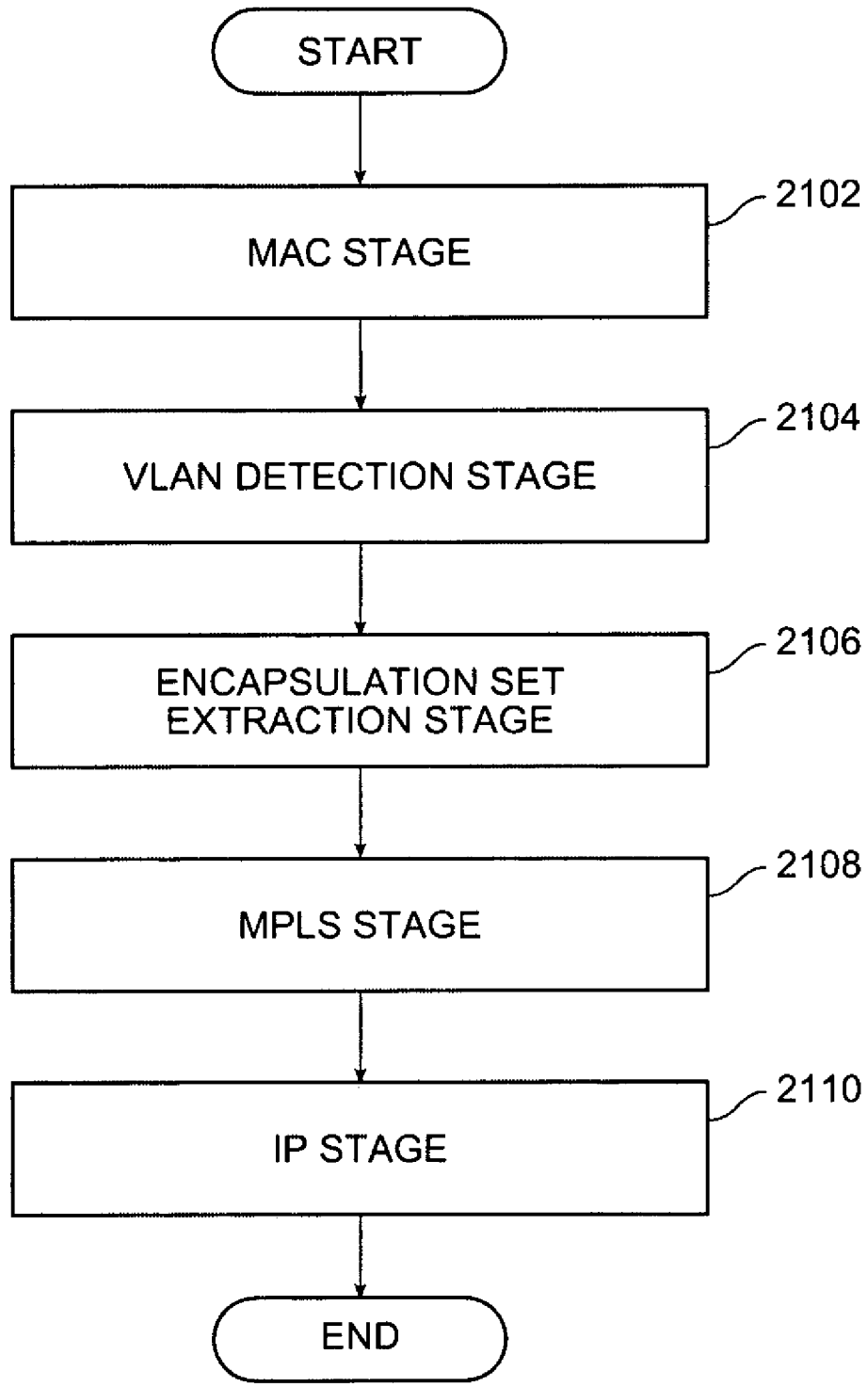
FIG. 21 is a block diagram illustrating the stages in one implementation of the system of FIG. 20.

In one embodiment, the system 2000 further comprises one or more additional stages configured to test for the presence of additional layers within the packet. One of skill in the art would appreciate how to incorporate these stages into the system based on the foregoing discussion. In one example, the system 2000 comprises the following five stages as illustrated in FIG. 21:

MAC Stage 2102
VLAN Detection Stage 2104
Encapsulation Set Extraction Stage 2106
MPLS Stage 2108
IP Stage 2110

In this example, the system 2000 is configured to parse a packet comprising a plurality of 64 bit PDUs as received over the receive side PBUS interface 118, or the transmit side PBUS interface 122, as illustrated in FIG. 1. In this example, each of the three instantiations of a parser illustrated in FIG. 1, parsers 126, 130, and 134, comprises the system 2000.

In each of these instantiations, the system 2000 is configured to begin operation upon the receipt of a start-of-packet (SOP) condition. In this particular example, the system 2000 is limited to testing the first 128 bytes of the packet, i.e., the first 16 PDUs. If an end of packet (EOP) condition is encountered prior to completion of processing of these 128 bytes, the system 2000 will terminate operation upon encountering the EOP condition.

Upon detecting the SOP condition, the system 2000 in this example first skips over 8 bytes, representing the AFH pre-pended to the packet. As received by parser 126, this AFH is an 8 byte null value pre-pended to the packet by the ingress MAC. As received by parsers 130 and 134, this AFH is populated by various items of packet classification or forwarding information.

Next, the system 2000 skips over pad and control information to locate the beginning of the MAC header. Since the size of this pad and control information varies depending on the type of interface involved, the system 2000 is provided with information indicating whether the ingress PBUS sub-channel is an Ethernet or Packet-Over-Sonet (POS) interface. If a POS interface, the system 2000 checks the PPID field to determine if the packet requires Bridged or Routed POS services. Based on this information, the system 2000 determines a programmable offset, and uses this programmable offset to skip over the pad and control information and locate the start of the MAC header.

In the MAC Stage 2102, the system 2000 extracts the MAC DA field and then decodes this MAC DA field to provide a Router Address, and Multicast and Broadcast flags. The system 2000 determines the Router Address by comparing the MAC DA field with one of eight possible Router Addresses, and, if a hit occurs, translating it into the Router Address.

In the VLAN Detection Stage 2104, the system 2000 tests the EtherType field for the presence of up to two nested VLAN headers, VLAN 0 and VLAN 1. To accomplish this, the system 2000 compares the EtherType field with each of two programmable probe values, Probe 0 and Probe 1, representing possible VLAN headers, and returns a 4 bit matrix representing the match status of the possible combinations of the two probes, i.e., Probe 0:VLAN 0, Probe 0:VLAN 1, Probe 1:VLAN 0, and Probe 1:VLAN 1.

In the Encapsulation Set Extraction Stage 2106, the system 2000 determines whether the packet is an Ethernet II, LLC or SNAP packet. It also extracts the relevant MAC control field to identify the payload, and to generate several flags identifying required packet services, such as IP v4, IP v6, MPLS, and IPX services.

In the MPLS Stage 2108, the system 2000 tests for the presence of an MPLS stack, and, if detected, an MPLS header walker is activated to determine the number of MPLS headers that are present in the stack. The MPLS header walker terminates its search upon detection of a Bottom-Of-Stack (S) bit.

In the case of a packet requiring Routed POS services, the processing performed by stages 2102, 2104, and 2106 is skipped and processing is resumed at the MPSL stage 2108.

Figure 22:
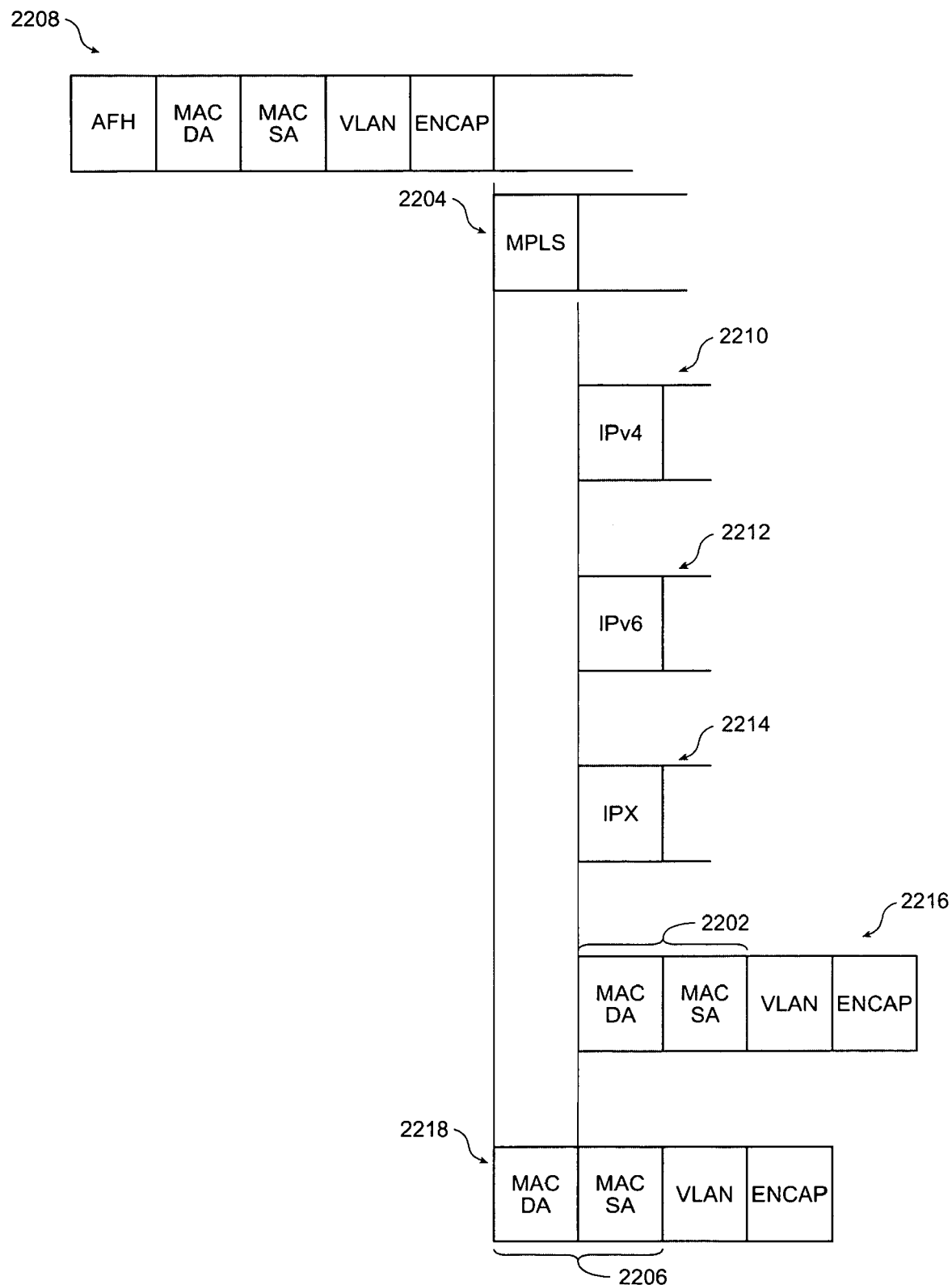
FIG. 22 illustrates one implementation of the process of detecting tunneling conditions.

The MPLS Stage 2108 is also configured to support tunneling. FIG. 22 illustrates two examples of other forms of tunneling that could be encountered by MPLS Stage 2108. The first is identified with numeral 2216 and is referred to as MPLS tunneling. The second is identified with numeral 2218 and is referred to as L2 or MAC tunneling. In one embodiment, the MPLS Stage 2108 first checks for MPLS tunneling, and if not present, it checks for L2 or MAC tunneling. If MPLS or L2 tunneling is detected, the MPLS Stage 2108 initiates a Page 1 parser (described below).

The MPLS Stage 2108 detects a MPLS tunneling condition when it detects a MAC header, identified with numeral 2202, after an MPLS stack, identified with numeral 2204, in lieu of an IP v4 header, identified with numeral 2210, an IP v6 header, identified with numeral 2212, or an IPX header, identified with numeral 2214. The MPLS Stage 2208 detects an L2 tunneling condition when it detects a MAC header, identified with numeral 2206, after the encapsulation set data structure, identified with numeral 2208, in lieu of an MPLS stack, identified with numeral 2204.

Upon encountering a tunneling condition, the MPLS Stage 2108 enters a paging mode of operation. In this paging mode of operation, the MPLS Stage 2108 associates the parsed data produced to date, i.e., the context pointers and flags, with a first page, page 0, initiates a second copy of the parser daisy-chained to the first to parse the remaining portion of the packet, and associates the parsed data produced by this second copy with a second page, page 1. Consequently, the first page (page 0) identifies the parsed data corresponding to the outer packet of the embedded packet, while the second page (page 1) identifies the parsed data corresponding to the inner packet of the embedded packet.

The IP Stage 2110 is activated upon detection of an initial IP v4 or v6 header structure, and utilizes an iterative process to detect and parse any Next Header structures that are present. Before parsing a detected Next Header structure, the stage 2110 checks a control bit in the structure to determine if parsing of the structure is desired. Separate bits are provided to respectively control v4 and v6 processing. If the control bit indicates that parsing of the structure is not desired, parsing of the structure is avoided or terminated. The IP Stage 2110 supports both PIM (Sparse Mode) and GRE packet decoding. Again, separate control bits are provided in the packet to respectively control v4 and v6 processing.

The IP Stage 2110 is configured to support up to two nested IP headers (deemed outer and inner) in order to handle IP v4 and IP v6 tunneling and similar services. In the case in which two IP headers are detected, the IP Stage 2110 performs Next Header processing for each of the headers. The IP Stage 2110 decodes fragment information to provide fragment offset information for both inner and outer IP headers. Also, the last IP header found that is not subject to Next Header processing is by definition a layer four header, and therefore the beginning of the layer four data structure within the packet.

Figure 23:
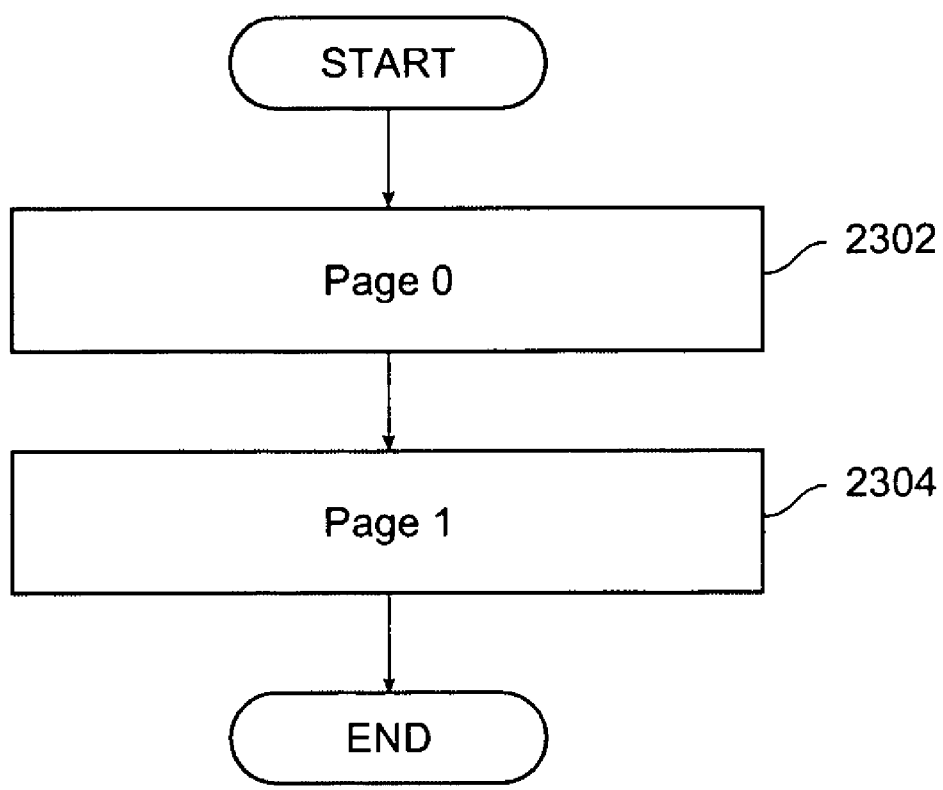
FIG. 23 illustrates an overview of the process of parsing a packet in a paged mode of operation.

The overall paging mode of operation is illustrated in FIG. 23. During step 2302, the various stages of the system are applied to the outer packet of an embedded packet to produce page 0 parsing data, and in step 2304, these stages are applied to the inner packet of the embedded packet to produce page 1 parsing data. In one example, the system 2000 produces the context pointers of FIG. 24 for each of the pages of an embedded packet.

An embodiment of a data structure representing a page of an embedded packet is illustrated in FIG. 25. The embedded packet comprises a first packet that forms the payload portion of a second packet. The first and second packets have locations within the embedded packet. Each of the first and second packets comprise one or more packet layers, each having a location within the respective packet. This data structure may be tangibly embodied or stored on a processor readable medium.

In one example, the data structure illustrated in FIG. 25 represents the outer packet or page of an embedded packet, and is followed by another such data structure representing the inner packet or page of an embedded packet. As illustrated, this data structure includes data that represents the following context pointers:

MAC Context Pointer—Starting byte location of MAC header.

EtherType Context Pointer—Starting byte location of EtherType/LLC/PPID field.

MPLS Context Pointer—Starting byte location of MPLS label stack.

L3 Outer Context Pointer—Starting byte location of Outer L3 Header.

L3 Inner Context Pointer—Starting byte location of Inner L3 Header.

L4 Context Pointer—Starting byte location of L4 Structure.

This data structure also includes data that represents the following packet flags:

VLAN Count—Absolute count of the number of VLANs detected in the packet:

Permissible values: 0x0, 0x1, 0x2.

Reserved: 0x3.

VLAN Match Matrix—Matrix reflecting VLAN probe vs. packet VLAN Header comparison:

Bits 3:0 correspond respectively to Probe 1:VLAN 1, Probe 1:VLAN 0, Probe 0:VLAN 1, and Probe 0:VLAN 0.

VLAN Tags 0,1—VLAN Tags for VLAN Headers 0 and 1 (if present)

EtherType—Extracted EtherType/PPID/LLC field.

MPLS Label Count—Absolute MPLS Label Count.

Outer IP Type—Encodes outer IP Header Type:

0x0—neither.

0x1—IP v4.

0x2—IP v6.

0x3—reserved.

Outer IP Fragment Type—Encodes outer IP Fragment type:

0x0—only or single.

0x1—first.

0x2—last.

0x3—middle.

Outer IP Don't Fragment.

For Outer IP Header—v4, reflects setting of Don't Fragment Flag.

For Outer IP Header—v6, always set.

Outer IP Protocol—Protocol field resulting from processing of Outer IP Header and any following Next Header structures.

Outer IP Next Header Exception—Exception flags for Outer IP Header, covering PIM, GRE and Next Header processing.

Inner IP Type—Encodes Inner IP Header type:

0x0—neither.

0x1—IP v4.

0x2—IP v6.

0x3—reserved.

Inner IP Fragment Type—Encodes Inner IP Fragment type:

0x0—only or single.

0x1—first.

0x2—last.

0x3—middle.

Inner IP Don't Fragment.

For Inner IP Header=v4, reflects setting of Don't Fragment flag.

For Inner IP Header—v6, always set.

Inner IP Protocol—Protocol field resulting from processing of Inner IP Header and any following Next Header structures.

Inner IP Next Header Exception—Exception flags for Inner IP Header, covering PIM, GRE and Next Header processing.

L4 OCS—Ones Complement Sum (OCS) of L3/L4 Structure.

In one embodiment, the context pointers are expressed in relation to the beginning of the respective page. Thus, the context pointers for the first page (page 0) are expressed in relation to a pointer to the beginning of the first page, while the context pointers for the second page (page 1) are expressed in relation to a pointer to the beginning of the second page.

In one application, different portions of the data structure of FIG. 25 are utilized by each of the three instantiations of parser illustrated in FIG. 1. FIG. 26 illustrates the portions of this data structures utilized, respectively, by these three instantiations, identified, respectively, with numerals 126, 130 and 134.

In one implementation example, any of the foregoing systems and methods may be implemented or embodied as one or more application specific integrated circuits (ASICs).

While various embodiments of the invention have been described, it will be apparent to those of ordinary skill in the art that many more embodiments and implementations are possible that are within the scope of this invention.

What is claimed is:

1. A method of parsing a packet in a system comprising one or more processors, the packet comprising a plurality of packet data units and a plurality of packet layers, each having locations, the method comprising:

testing one or more of the packet data units within a first window for the presence of a first packet layer;

identifying the location of the first packet layer within the packet if the first packet layer is detected within the first window;

testing one or more of the packet data units within a second window for the presence of a second packet layer, the second packet layer corresponding to a layer in an applicable reference model distinct from that the first packet layer corresponds to, the one or more packet data units in the second window partially but not completely overlapping the one or more packet data units in the first window to account for uncertainty in the location of the second layer relative to the first, and the testing of the one or more packet data units in the second window occurring in parallel with the testing of the one or more packet data units in the first window, such that parallel testing for the presence of the first and second packet layers is performed; and as part of or following this parallel testing, identifying the location of the second packet layer within the packet if the second packet layer is detected within the second window, including deferring completing such identifying until after completing the identifying of the location of the first packet layer or it has been determined that such first layer is absent from the packet, to allow more accurate identification of the location of the second packet layer relative to the first.

2. The method of claim 1 wherein the packet data units are of a predetermined size.

3. The method of claim 1 wherein the step of identifying the location of the first packet layer within the packet comprises forming first data identifying the location of the first packet layer.

4. The method of claim 3 wherein the first data identifies the beginning of the first packet layer.

5. The method of claim 3 wherein the first data is expressed in absolute terms.

6. The method of claim 3 wherein the first data is expressed in relative terms.

7. The method of claim 6 wherein the packet is the outer packet of an embedded packet, and the first data is expressed relative to the location of the outer packet.

8. The method of claim 7 wherein the first data is expressed relative to the beginning of the outer packet.

9. The method of claim 6 wherein the packet is the inner packet of an embedded packet, and the first data is expressed relative to the location of the inner packet.

10. The method of claim 9 wherein the first data is expressed relative to the beginning of the inner packet.

11. The method of claim 3 wherein the first data is pointer data.

12. The method of claim 1 wherein the step of identifying the location of the second packet layer with the packet comprises forming second data identifying the location of the second packet layer.

13. The method of claim 12 wherein the second data identifies the beginning of the second packet layer.

14. The method of claim 12 wherein the second data is expressed in absolute terms.

15. The method of claim 12 wherein the second data is expressed in relative terms.

16. The method of claim 15 wherein the packet is the outer packet of an embedded packet, and the second data is expressed relative to the location of the outer packet.

17. The method of claim 16 wherein the second data is expressed relative to the beginning of the outer packet.

18. The method of claim 15 wherein the packet is the inner packet of an embedded packet, and the second data is expressed relative to the location of the inner packet.

19. The method of claim 18 wherein the second data is expressed relative to the beginning of the inner packet.

20. The method of claim 12 wherein the second data is pointer data.

21. The method of claim 1 further comprising testing for the presence of additional packet layers within the packet, and identifying the locations of such additional packet layers if such are detected within the packet, the additional packet layers being distinct from both the first packet layer and the second packet layer within an applicable reference model.

22. The method of claim 1 wherein the first and second windows are of the same predetermined size.

23. A processor readable medium storing one or more software instructions embodying the method of claim 1.

24. A system for parsing a packet, the packet comprising a plurality of packet data units and a plurality of packet layers, each having locations, the system comprising:

a buffer for buffering a plurality of the packet data units;

a first stage configured to test one or more of the buffered packet data units within a first window for the presence of a first packet layer, and to identify the location of the first packet layer within the packet if the first packet layer is detected within the first window; and a second stage configured to test one or more of the buffered packet data units within a second window for the presence of a second packet layer, the second packet layer corresponding to a layer of an applicable reference model distinct from that the first packet layer corresponds to, the one or more buffered packet data units in the second window partially but not completely overlapping the one or more buffered packet data units in the first window to account for uncertainty in the location of the second packet layer relative to the first, and the testing of the one or more buffered packet data units in the second window occurring in parallel with the testing of the one or more buffered packet data units in the first window, such that parallel testing for the presence of the first and second packet layers is performed;

the second stage further configured to identify, as part of or following this parallel testing, the location of the second packet layer within the packet if the second packet layer is detected within the second window, and defer completing such identification until after the identification of the location of the first packet layer has been completed or it has been determined that such first layer is absent from the packet, to allow more accurate identification of the location of the second packet layer relative to the first.

25. The system of claim 24 wherein each of the first and second stages are implemented as software executing on a processor.

26. The system of claim 24 wherein the first stage is configured to identify the location of the first packet layer by forming first data identifying the location of that packet layer.

27. The system of claim 26 wherein the first data identifies the beginning of the first packet layer.

28. The system of claim 24 wherein the second stage is configured to identify the location of the second packet layer by forming second data identifying the location of that packet layer.

29. The system of claim 28 wherein the second data identifies the beginning of the second packet layer.

30. The system of claim 24 further comprising one or more additional stages configured to test for the presence of additional packet layers within the packet, the additional packet layers being distinct from both the first packet layer and the second packet layer within an applicable reference model.

31. The system of claim 24 wherein the packet is an embedded packet comprising a first packet forming the payload portion of a second packet, and the first stage is configured to test for the presence of the first packet layer in the first and second packets.

32. The system of claim 24 wherein the packet is an embedded packet comprising a first packet forming the payload portion of a second packet, and the second stage is configured to test for the presence of the second packet layer in the first and second packets.

33. A system for parsing a packet, the packet comprising a plurality of packet data units and a plurality of layers, each having a location within the packet, the system comprising:

buffer means for buffering a plurality of the packet data units;

first stage means for testing one or more of the buffered packet data units within a first window for the presence of a first packet layer, and identifying the location of the first packet layer within the packet if the first packet layer is detected within the first window; and second stage means for testing one or more of the buffered packet data units within a second window for the presence of a second packet layer, the second packet layer corresponding to a layer of an applicable reference model distinct from that the first packet layer corresponds to, the one or more buffered packet data units in the second window partially but not completely overlapping the one or more buffered packet data units in the first window, and the testing of the one or more buffered packet data units in the second window occurring in parallel with the testing of the one or more buffered packet data units in the first window to account for uncertainty in the location of the second packet layer relative to the first, such that parallel testing for the presence of the first and second packet layers is performed; and (2) identifying, as part of or following this parallel testing, the location of the second packet layer within the packet if the second packet layer is detected within the second window, including deferring completing such identifying until after the identifying of the location of the first packet layer has been completed or it has been determined that such first layer is absent from the packet, to allow more accurate identification of the location of the second packet layer relative to the first.

* * * * *